United States Patent
Bender et al.

(10) Patent No.: US 7,844,640 B2
(45) Date of Patent: Nov. 30, 2010

(54) DATA MAPPING VISUALIZATION

(75) Inventors: Lothar H. Bender, Rauenberg (DE); Christian Georgi, Mannheim (DE)

(73) Assignee: SAP AG, Walldorf (DE)

( * ) Notice: Subject to any disclaimer, the term of this patent is extended or adjusted under 35 U.S.C. 154(b) by 451 days.

(21) Appl. No.: 10/740,178

(22) Filed: Dec. 17, 2003

(65) Prior Publication Data
US 2005/0138057 A1    Jun. 23, 2005

(51) Int. Cl.
G06F 7/00      (2006.01)
G06F 17/30     (2006.01)
G06F 9/44      (2006.01)

(52) U.S. Cl. .................... 707/805; 707/810; 717/105

(58) Field of Classification Search ............. 707/102, 707/805, 810; 715/513; 717/105
See application file for complete search history.

(56) References Cited

U.S. PATENT DOCUMENTS

| | | | |
|---|---|---|---|
| 6,732,331 B1 * | 5/2004 | Alexander | 715/513 |
| 7,278,130 B2 * | 10/2007 | Iborra et al. | 717/101 |
| 2003/0069908 A1 * | 4/2003 | Anthony et al. | 707/513 |
| 2005/0005261 A1 * | 1/2005 | Severin | 717/108 |
| 2005/0065970 A1 * | 3/2005 | King et al. | 707/102 |

* cited by examiner

Primary Examiner—Apu M Mofiz
Assistant Examiner—Chelcie Daye
(74) Attorney, Agent, or Firm—Finnegan, Henderson, Farabow, Garrett & Dunner, L.L.P.

(57) ABSTRACT

A method and apparatus, including a computer program product, implementing techniques for providing a context building tool that facilitates the building of a context from an existing model or context. The tool can receive a model specification and generate a storage area structure including multiple nodes, each node corresponding to a model class, multiple attributes, each attribute corresponding to a model class property, and relationships between the nodes and attributes based on the relationships between the model classes. The tool can also receive a context specification and generate a source storage area structure including one or more source nodes, each source node corresponding to a target node, one or more source attributes, each source attribute corresponding to a target attribute, and relationships between the source nodes and source attributes based on the relationships between the target nodes and target attributes.

26 Claims, 25 Drawing Sheets

DATA MAPPING VISUALIZATION

BACKGROUND

The present invention relates to electronic data processing in general, and more particularly to application programming.

Applications can be developed using various architectures, including, for example, a model-view-controller (MVC) architecture. The MVC architecture breaks an application into three separate parts—models, views, and controllers. Each model can have multiple views, where each view displays information about the model to a user. A controller of the model receives events, for example, raised by a user interacting with a view to manipulate the model. Each model can have multiple controllers, and a controller can relate to multiple views. The models and the controllers typically include application code. When changes occur in a model, the model updates its views. Data binding can be used for data transport between the view and its model or controller. For example, where a table view is defined to display data from a corresponding table stored in the model or controller, the table can be bound to and thus used as the data source for the table view. The table view can be replaced by a further view, such as a graph view, that binds against the same table. In this case, the further view can display the table data without changing anything in the controller or the model.

Application development is often divided into two general stages: design time and runtime. The design time stage can include steps such as designing the views of an application (including the layout of the user interface elements in each view), modeling of the application flow (including the selection of the views to displayed), designing one or more models, and creating and editing other application elements, such as controllers and contexts. The design time stage can also include the binding of user interface (UI) elements within the views to data sources that are defined in a data type repository.

Regardless of which architecture is used, it is often desirable to structure an application (including, for example, the models, views, and controllers that make up an MVC application) into reusable entities or components.

SUMMARY OF THE INVENTION

In general, in one aspect, the invention provides methods and apparatus, including computer program products, implementing techniques for providing a context building tool that can be used by a user to facilitate the building of a context from an existing model.

The techniques include receiving a specification of a model including multiple model classes, each model class having one or more model class properties and one or more relationships to other model classes, and generating a storage area structure based on the specification of the model. The generated storage area structure includes multiple nodes, each node corresponding to a model class, multiple attributes, each attribute corresponding to a model class property, and relationships between the nodes and attributes based on the relationships between the model classes. The operation to generate the storage area structure can be initiated by user input (e.g., a drag-and-drop operation) provided in a graphical user interface under the guidance of a wizard.

The techniques can include naming the nodes and attributes based on the corresponding model classes and model class properties, modifying one or more properties of the generated storage area structure, renaming one or more of the nodes and attributes in the storage area structure and displaying the generated storage area structure in a graphical user interface.

The techniques can include binding each node in the generated storage area with a corresponding model class using a model binding, and binding each attribute in the generated storage area with a corresponding model class property using a model binding. The techniques can include modifying one or more model bindings of the generated storage area structure in response to a user input provided in a graphical user interface.

In general, in another aspect, the invention provides methods and apparatus, including computer program products, implementing techniques for providing a context building tool that can be used by a user to facilitate the building of a context from an existing context.

The techniques can include receiving a specification of a source storage area structure comprising one or more source nodes and source attributes, and relationships between the source nodes and source attributes, and generating a source storage area structure based on the specification of the source storage area structure. The source storage area structure includes one or more source nodes, each source node corresponding to a target node, one or more source attributes, each source attribute corresponding to a target attribute, and relationships between the source nodes and source attributes based on the relationships between the target nodes and target attributes. The operation to generate the source storage area structure can be initiated by user input (e.g., a drag-and-drop operation) provided in a graphical user interface under the guidance of a wizard.

The techniques can include naming the source nodes and source attributes based on the corresponding target nodes and target attributes, modifying one or more properties of the generated source storage area structure, renaming one or more of the source nodes and source attributes in the source storage area structure, and displaying the generated source storage area structure in a graphical user interface.

The techniques can include mapping each source node in the generated source storage area to a target node using a context mapping, mapping each source attribute in the generated source storage area to a target attribute using a context mapping, and modifying one or more context mapping of the generated source storage area structure in response to a user input provided in a graphical user interface.

Advantages that can be seen in particular implementations of the invention include one or more of the following. The systems and techniques described herein facilitate application development by simplifying the creation of context hierarchies and the specification of mappings and bindings between contexts and models. Some implementations allow developers to create contexts and to specify mappings and bindings through simple operations such as drag-and-drop operations. Other implementations assist developers to perform those functions through the use of wizards. Developers can thus avoid having to create all contexts manually, which can be a tedious and time-consuming task. Developers can also build complex contexts and define mappings and bindings without necessarily having detailed knowledge about the underlying concepts. One implementation includes all of the foregoing advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
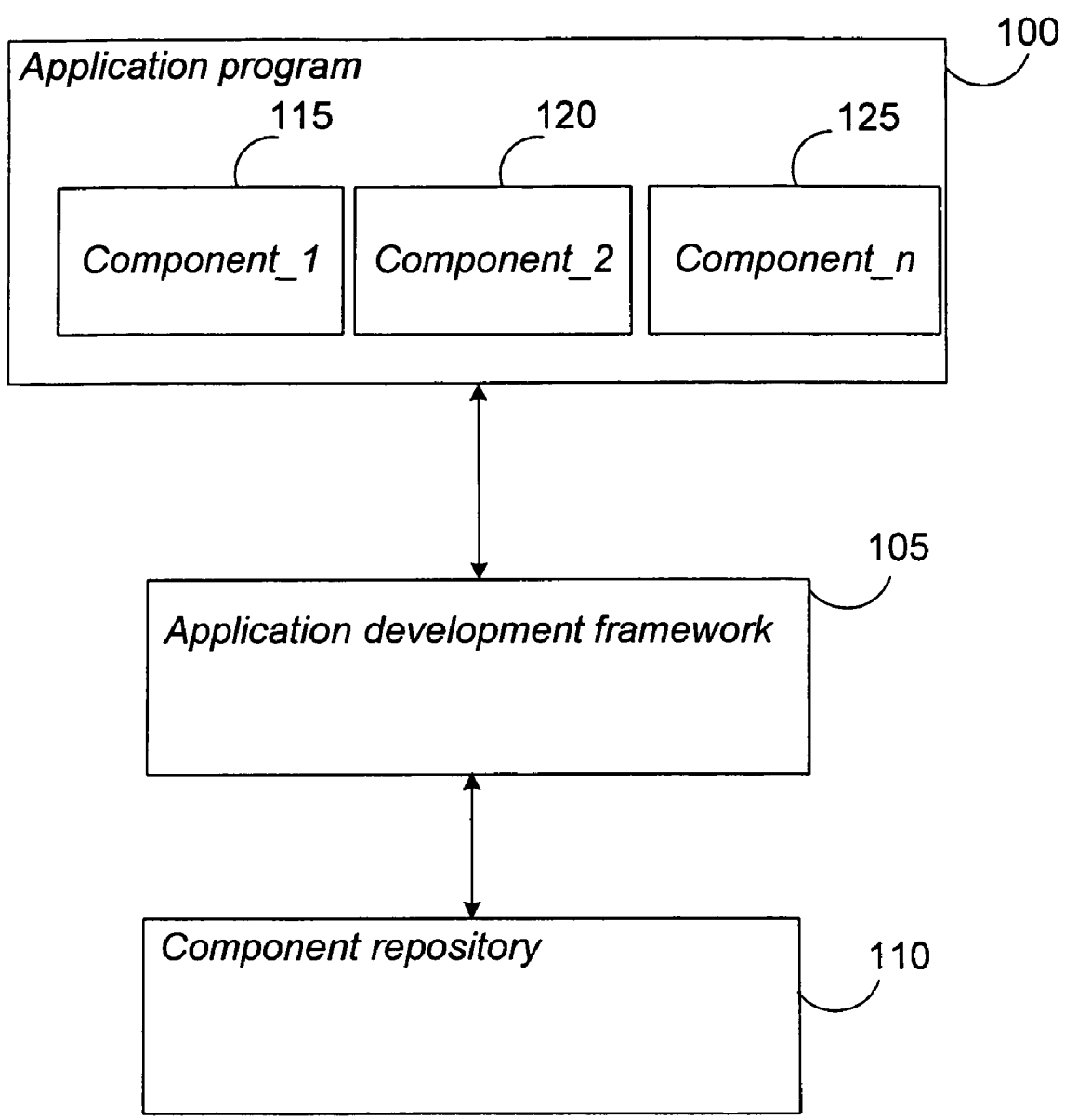
FIG. 1 is a block diagram of a development environment for developing an application program using reusable components.

FIG. 1 is a block diagram of an environment for developing an application program 100 using reusable components. The development environment includes an application development framework 105 and a component repository 110. The application program 100 is developed using reusable components available in the component repository 110, e.g., components 115, 120, and 125. A component in the component repository 110 can have more than one instance, where the component instances are used in multiple application programs. The application program 100 is developed at design time using the application development framework 105.

At runtime, the application runs within a runtime framework that provides the code required to create and manage the instances of the components used by the application program 100. As discussed below, the services provided by the runtime framework include component lifecycle management and managing component event subscriptions.

Figure 2A:
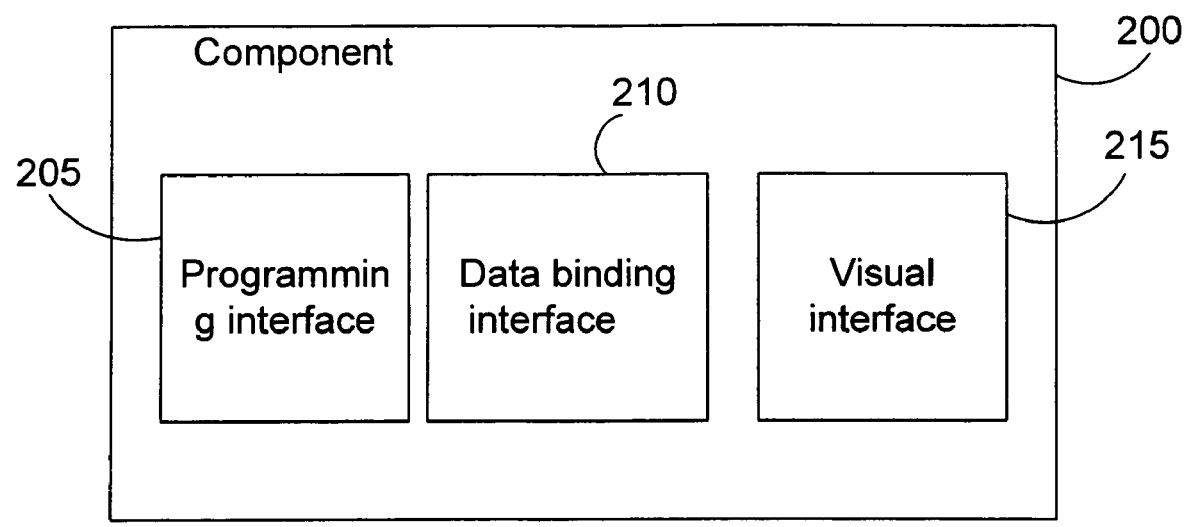
FIG. 2a is a block diagram of a component.

FIG. 2a is a block diagram of a reusable component 200. The reusable component 200 is a reusable entity providing functionality that can be used by many applications (or that can be used multiple times by the same application). Reusable components 200 can be embedded, and they can have one or more visual representations. An application or another component that embeds the reusable component 200 is referred to as a component embedder for the reusable component 200, and the reusable component 200 is referred to as the embedded component.

The reusable component 200 provides three separate interfaces—a programming interface 205, a data binding interface 210, and a visual interface 215. The programming interface 205 is used by the component embedder to interact with the reusable component 200. The programming interface is an active element. The programming component interface is not just a signature. The programming interface defines the component methods that are visible to the component embedder and routes the visible method calls to one or more component implementations.

The component embedder interacts with the embedded component 200 by using the programming interface 205, the data binding interface 210, and the visual interface 215. The embedded component 200 can interact with the component embedder by generating events. The component embedder can subscribe to events generated by the embedded component 200, and react to such events.

In one implementation, the programming interface 205 is provided by a controller, referred to as a component interface controller. Thus a component embedder can interact with an embedded component through the interface controller of the embedded component.

The reusable component 200 also has one or more visual representations (which will be referred to as views). As described below, a component embedder can access and use the visual representations of the reusable component 200 (for example, to form its own visual representations) through the visual interface 215.

The data binding interface 210, described below, is used by a component embedder to exchange data with the reusable component 200.

In one implementation, the reusable component 200 encapsulates one or more controllers, one or more associated contexts, and optionally one or more views. The controllers are used to implement the logic of the reusable component, and the views provide a visual representation of the reusable component. A reusable component can include multiple types of controllers, as explained below. The controllers can implement event handlers that are executed in response to an action performed by a user, e.g., pressing a button or making a menu selection. Each controller is bound to an associated context. A context is a local data structure for a controller that stores data and state specific to the controller.

Figure 2B:
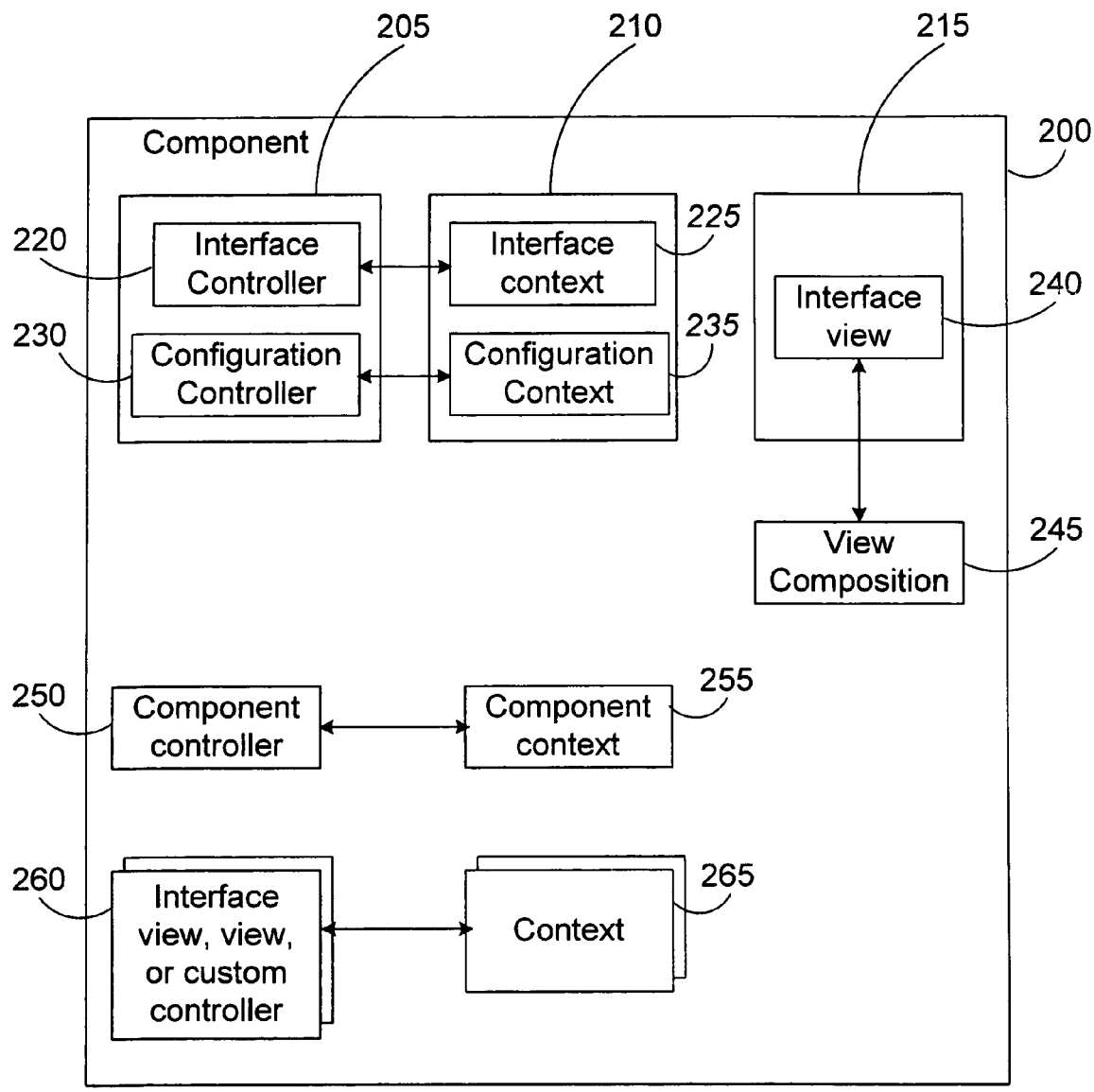
FIG. 2b illustrates further features of a component.

FIG. 2b illustrates further features of a reusable component 200. The programming interface 205 for the reusable component 200 includes an interface controller 220 and a configuration controller 230. The interface controller 220 implements methods that can be used (e.g., by a component embedder) to interact with the reusable component 200. The configuration controller 230 provides access to configuration data for the reusable component 200. The interface controller 220 has an associated interface context 225 that stores data and state for the interface controller 220. The configuration controller 230 has an associated configuration context 235 that stores configuration data for reusable component 200. The component embedder uses the data binding interface 210 to exchange data with the interface context 225 and the configuration context 235. The runtime framework initializes the configuration context 235 when an instance of the reusable component 200 is created at runtime using configuration data provided by the component embedder. The configuration data stored in the configuration context can include data used by the component embedder to customize the reusable component 200, e.g., font size, and selection of fields for a table view.

A component developer can designate one of the views in a view composition 245 of a component as an interface view 240. In one implementation, the interface view does not have an associated view controller. The interface view 240, and its associated inbound plug and outbound plug (described below), are the visual interface for the reusable component

200. At design time, the component embedder can use navigation links to specify view transitions to the interface views 240 of embedded components 200 like any other view in the view composition of the component embedder. A component can present more than one visual interface by defining more than one interface view.

As shown in FIG. 2b, the reusable component 200 can also include a component controller 250 and associated contexts 255 that are used to implement common functionality required by views implemented by the component. The component controller receives control when the component is instantiated, after the component instance has been initialized. The reusable component 200 can also include one or more custom controllers 260 and associated contexts 265. The custom controllers 260 and associated contexts 265 are used to implement and structure functionality and data storage for the reusable component 200.

Figure 3:
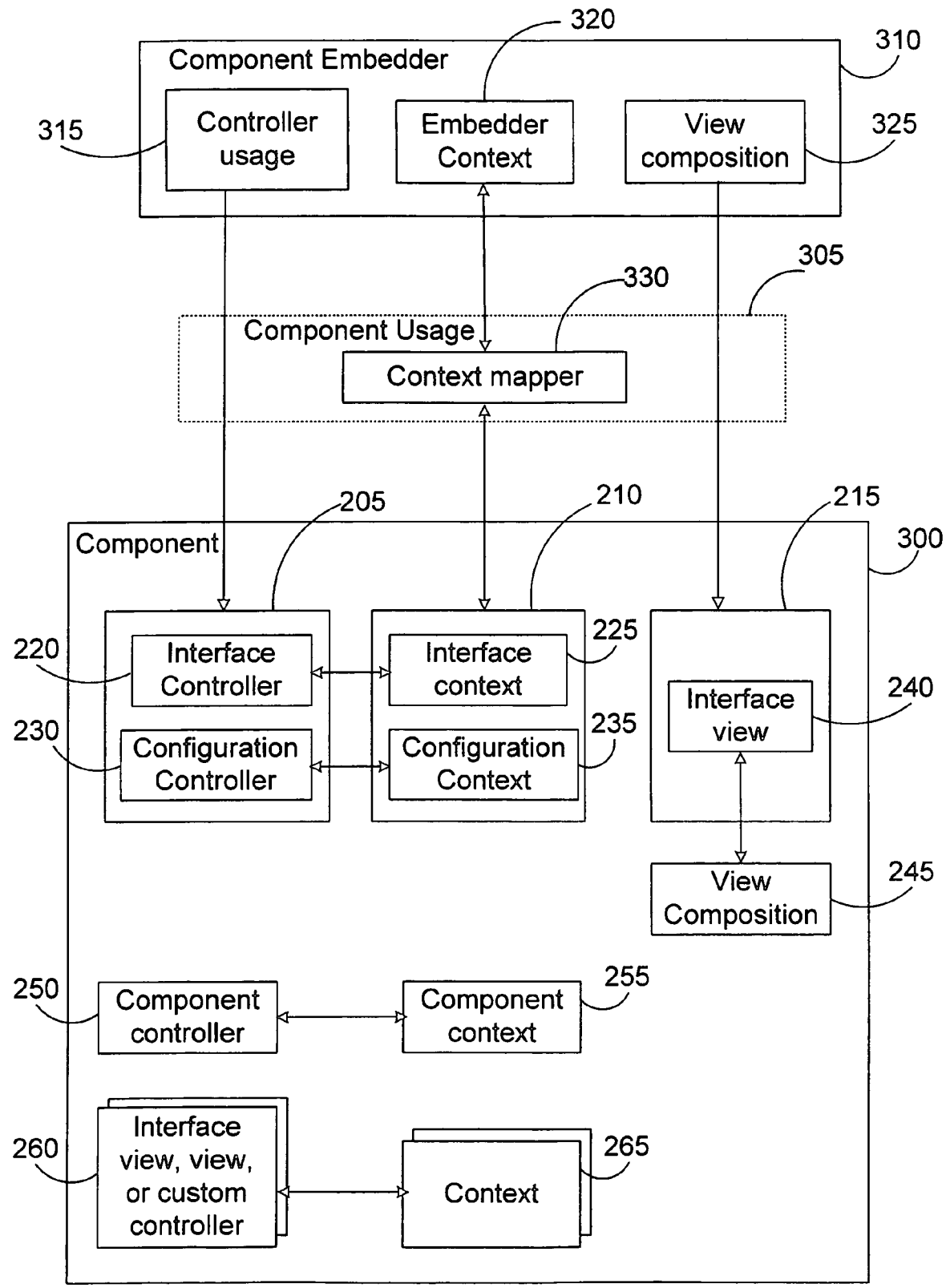
FIG. 3 is a block diagram of a system for accessing an embedded component instance.

FIG. 3 is a block diagram of a component embedder 310 using an instance 300 of an embedded component 200 at runtime. The embedded component instance 300 is generally created at runtime. The embedded component 200 is reusable, and several instances 300 of the embedded component 200 can be used at the same time. In the implementation shown in FIG. 3, a runtime framework provides the services necessary for managing multiple component instances 300. Services provided by the runtime framework include the creation of component instances, e.g., using a component factory method to create component instances, and managing the lifecycle of component instances, e.g., deleting component instances embedded by a component embedder when the component embedder is deleted. Thus, neither the component embedder nor the embedded component 200 needs to include code for managing multiple component instances 300.

Component usage object 305 is an object provided by the application development framework 105 to manage multiple component instances. Each component usage object 305 is associated with a component.

The component usage object 305 provides methods that can be used by the component embedder for life-cycle management of the associated reusable component 200. At design time an application programmer can program an application using a programming interface for a component without specifying a particular implementation of the component. At run time, the component embedder 310 creates a component instance 300 that implements the component programming interface used by the component embedder by calling methods provided by the component usage object 305. The component usage object 305 responds to requests to create a component instance by selecting a component in the repository 110 that implements the desired programming interface and creating an instance of the selected component. Alternatively, if the application programmer specifies a component implementation at design time, an instance of the specified component can be created and used at runtime.

A context is a local data structure for a controller that stores data and state specific to the controller. Controllers within a component, e.g., the interface controller, the configuration controller, the component controller, custom controllers, and view controllers, can communicate or share data with each other through the use of mappings (e.g., through the mapping of one or more data elements from a first context to a second context). For example, the component embedder 310 can share data with the embedded component 300 by mapping (elements of) one or more contexts from the component embedder 310 to (elements of) the interface context 225 or the configuration context 235 using the context mapper 330.

Figure 4:
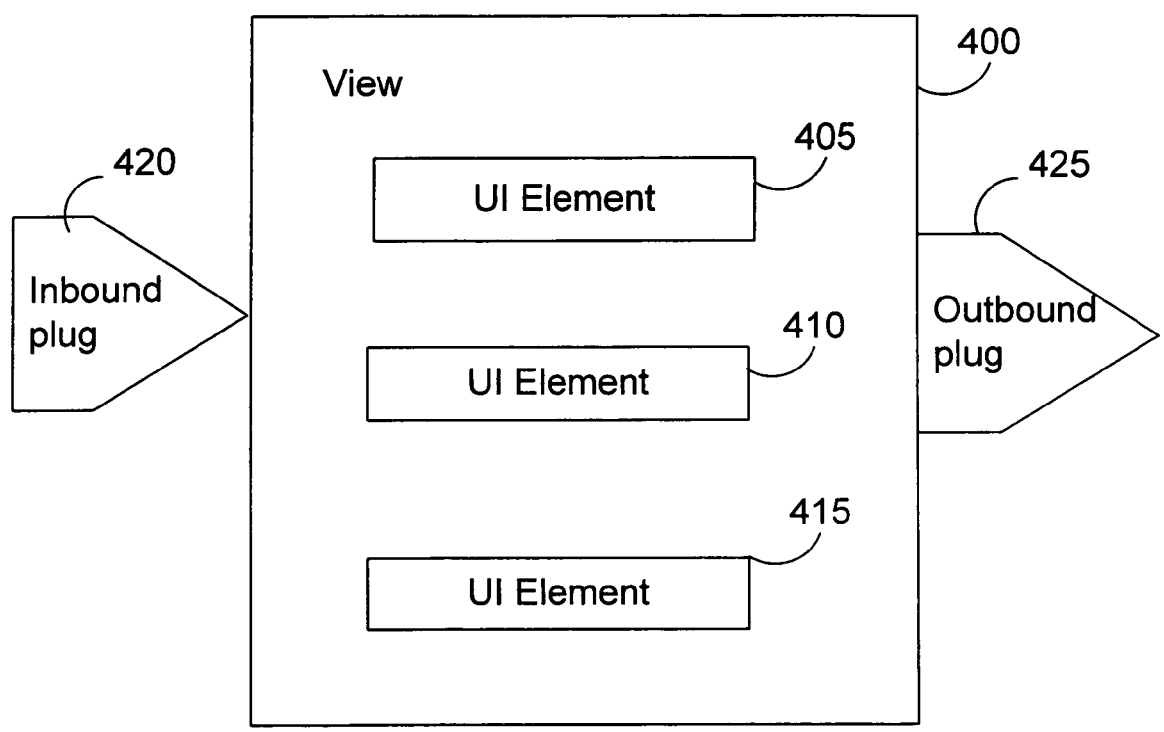
FIG. 4 is a block diagram of a view.

FIG. 4 is a block diagram of a view. A visual interface of a software application is made up of one or more views arranged in a specific layout. A view 400 specifies a layout of at least one user interface element 405, and a view area. UI elements in a view can include buttons, labels, and menus. The view area defines the area to be occupied by the view 400 in a visual interface embedding the view 400. The UI elements included in the view 400 can include Input UI elements, View UI elements, and Container UI elements. An Input UI element (e.g., a drop down menu, an input field, or a table UI element) is used to receive input from a user. A View UI element (e.g., an image view, a text view, or a caption) is used to display application data. A Container UI element (e.g., a scroll container UI element having a scroll bar, or a container UI element specifying a layout for included views) is used to include other views and UI elements.

The visual interface can have more than one view, of which only some views may be visible at any time. The views that are visible in the visual interface can change, e.g., in response to input from the user. Inbound plugs, outbound plugs, and navigation links are design time constructs that are used by an application developer to specify transitions between the views. In one implementation, each view has an inbound plug 420 and an outbound plug 425. At design time, each navigation link establishes a potential transition from the view with the outbound plug 425 to the view with the inbound plug 420. At design time, a transition from a first view to a second view is specified by connecting the outbound plug 425 of the first view to the inbound plug of the second view. The navigation links are processed at runtime to cause the view transitions specified at design time. At run time, the application calls the outbound plug of the first view to cause a transition from the first view to the second view.

Each inbound plug 420 includes an application specific event handler, and calling the inbound plug results in running the event handler for the inbound plug 420 before displaying the view 400 corresponding to the inbound plug 420. Navigation links are typically processed in a runtime framework by calling all the inbound plugs 420 connected to an outbound plug when the outbound plug is called. An event handler for an inbound plug 420 can in turn call the outbound plug 425 for the view corresponding to the inbound plug to cause other views connected to the outbound plug 425 to be displayed. The application can use an event handler for the inbound plug 420 to initialize the corresponding view.

The view 400 can have an associated view controller that includes one or more event handlers associated with the inbound plug. The view controller also contains event handlers for the UI elements in the view, as well as presentation logic for the view. Presentation logic can include actions such as triggering events in response to user interaction with user interface elements in the view. The view controller stores data and state in an associated view context. The view context can be used to communicate data between the view controller and another controller by mapping the view context to the context of the other controller (and vice versa).

A component can specify any number of views at design time, any of which can be displayed at runtime. The set of views that can be displayed, for the component or for an application using the component, is referred to as a view composition. A view assembly is a set of views that are actually displayed at runtime. A view assembly, for an application or a component, is made up of views from the view composition that are selected for display at a certain point in time. When a navigation link is processed at runtime, a view in a current view assembly may be replaced by one or more destination views from the view composition.

Figure 5:
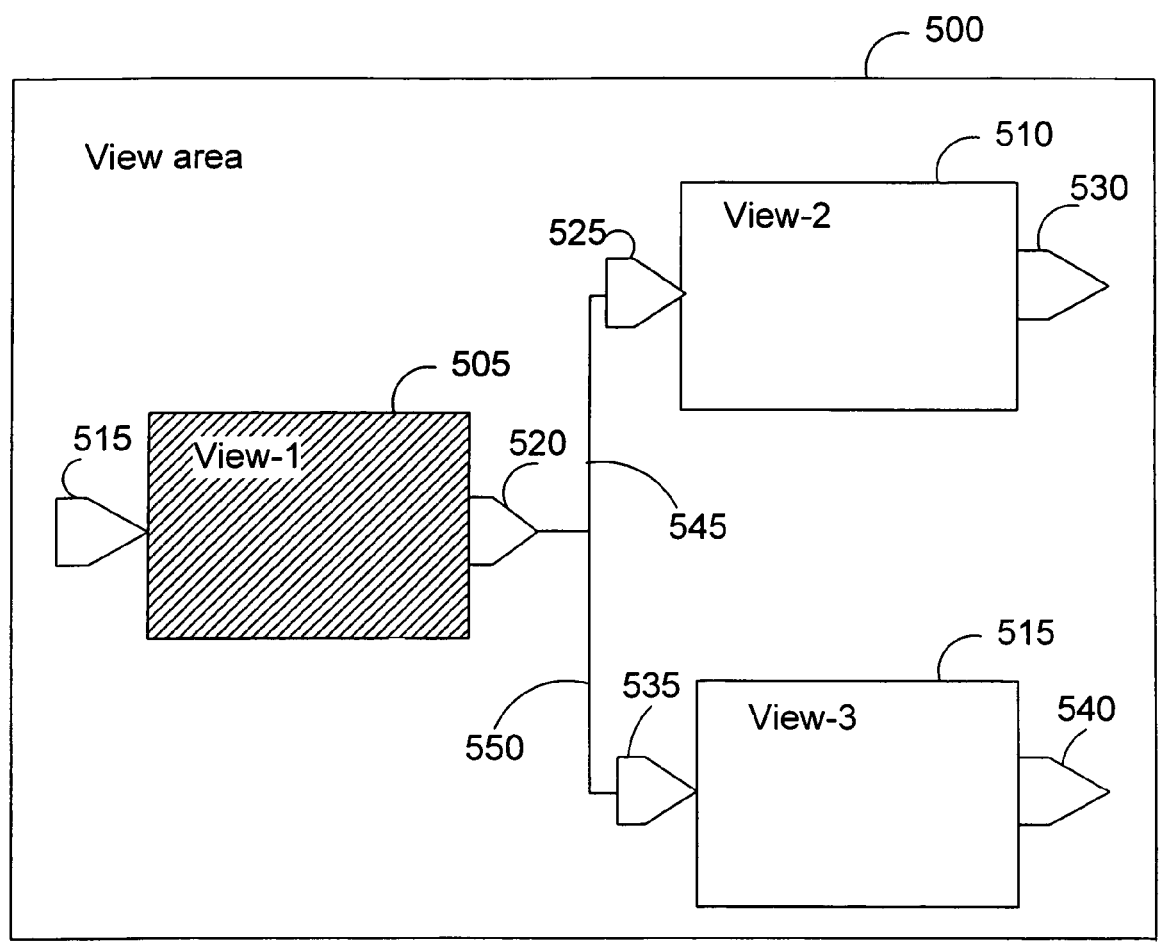
FIG. 5 illustrates a visual interface with multiple views that are linked together using navigation links.

FIG. 5 illustrates a visual interface with multiple views that are linked together using navigation links. Each navigation link connects an inbound plug to an outbound plug. The view area 500 includes three views 505, 510, and 515, of which view 505 is currently displayed in the view area 500. View 505 has inbound plug 515 and outbound plug 520. View 510 has inbound plug 525 and outbound plug 530. View 515 has inbound plug 535 and outbound plug 540. Outbound plug 520 is connected to inbound plug 525 by a navigation link 545, and outbound plug 520 is connected to inbound plug 535 by a navigation link 550. If view 505 activates outbound plug 520 by triggering the specified event for the outbound plug 520, views 510 and 515 are displayed in the view area 500 instead of view 505.

Applications can make use of components that contain view compositions. Components can embed other components, such that a first component can interact with and make use of a second, embedded component. The view composition of the first component can include views from the view composition of the second component. Similarly, the view composition of the application can include views of the components used by the application. In addition, an application developer can design application-specific views that are part of the application's view composition.

Figure 6:
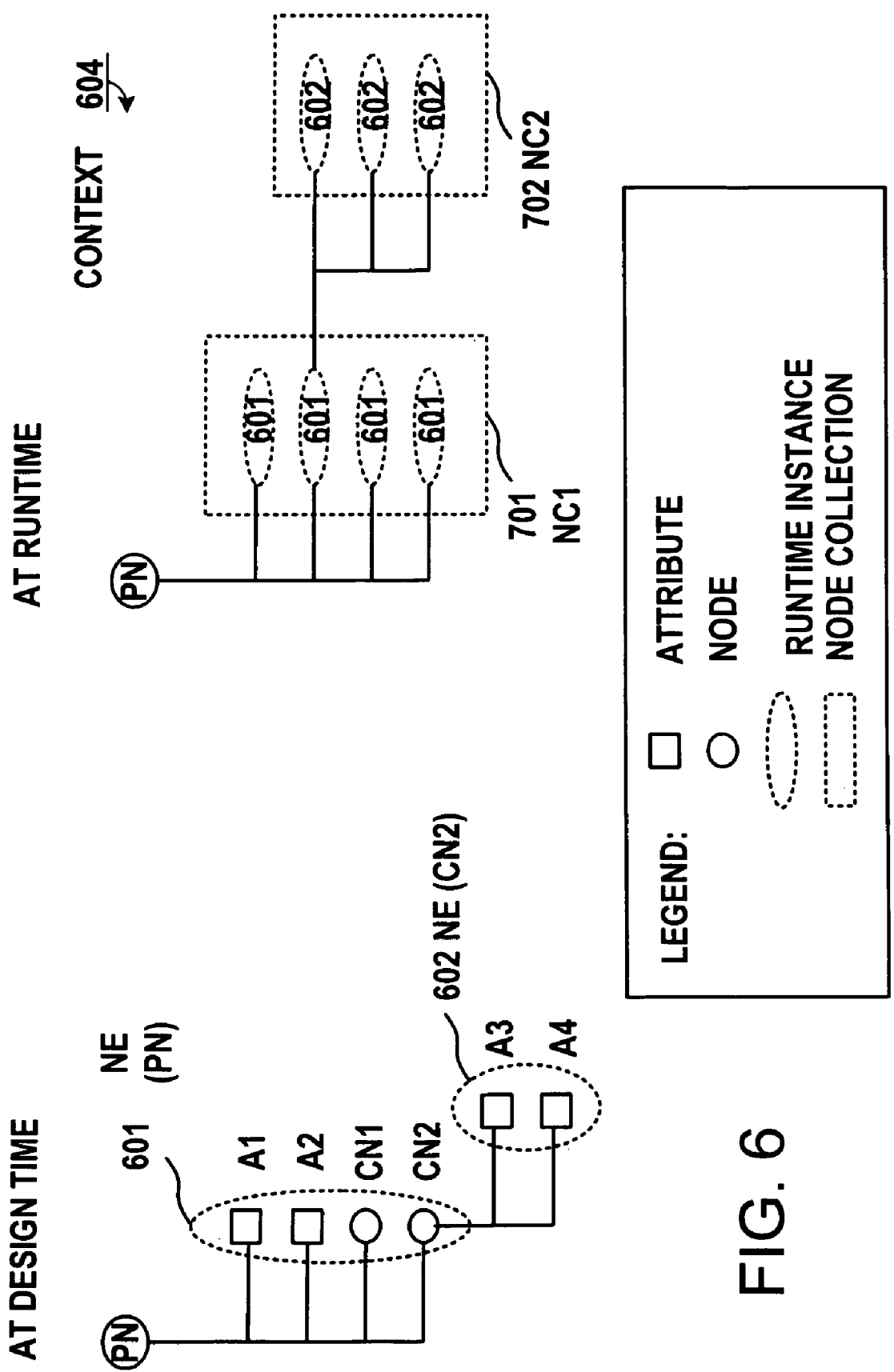
FIG. 6 illustrates an example of a structure of a context at design time and at runtime.

FIG. 6 illustrates an implementation of a context 604 at design time and at runtime. As shown in the example in FIG. 6, the design time context structure can be different from the runtime context structure.

In the example in FIG. 6, the design time context structure is a node hierarchy containing nodes and attributes. The root node of the node hierarchy represents the context itself. The child nodes of the root node can be defined by the application. Child nodes of the root node will be referred to as independent nodes. Child nodes of independent nodes depend on their corresponding parent node and will be referred to as dependent nodes.

In one implementation, a node can be either a value node or a model node. A value node maintains, that is, stores and administers, its own application data (e.g., transient application data). The data can be, for example, scalar data, tables, or structures. A model node includes a reference to application data that persists in a corresponding model.

A node (e.g., a parent node) can store data in attributes. Each child node can include an arbitrary tree structure that includes further child nodes and/or attributes. Attributes are leaves in the tree structure. Attributes represent, for example, scalar data types, such as strings and integers, or Java types (e.g., java.util.Date).

In FIG. 6, at design time, the context 604 includes the independent node PN that has two attributes A1, A2, and that is the parent node of the dependent nodes CN1, CN2. The second dependent node CN2 has two further attributes A3, A4. This structure defines a first node element 601 for the parent node PN, and a second node element 602 for the second child node CN2. The first node element 601 includes information about the context structure with regard to the parent node PN. In other words, it describes the constituent elements of the parent node PN. The second node element 602 includes information about the context structure with regard to the second dependent node CN2—that is, it describes the constituent elements of the child node CN2. The structure of the context hierarchy shows that the second node element 602 (which corresponds to the child node CN2) depends on the first node element 601 (which corresponds to the parent node PN).

At runtime, the structure elements of a context (e.g., nodes) can be represented as a set of data instances. Nodes provide type information about data instances that are maintained by the node. Each node can have a node collection, wherein each element of the node collection has the same type.

For example, in FIG. 6, at runtime, the parent node PN corresponds to a first node collection 701 that includes multiple runtime instances of the first node element 601. Each runtime instance of the first node element 601 can have the attributes A1 and A2, a node collection corresponding to child node CN1, and a node collection corresponding to child node CN2. An example of the latter node collection is shown in FIG. 6 as node collection 702, which contains multiple runtime instances of the second node element 602. A node collection can be empty, or can have at least one instance of the corresponding node element.

A node collection can have a cardinality and a node collection type, such as list, tree, set, or collection. The node collection cardinality (see, e.g., Table 2) and the node collection type (see, e.g., Table 1) can be declared at design time. An evaluation mechanism can be used to automatically evaluate (provide values for) the node collection of a child node at runtime when its parent node changes.

TABLE 1

Examples of Node Collection Types

| Value | Properties |
|---|---|
| Collection | forward-only iterator (cursor) without absolute positioning |
| Set | no duplicates, forward-only iterator without absolute positioning |
| List | duplicates allowed, position available, list iterator, absolute positioning (indexed access) |

The application can use the cardinality of a node collection to restrict possible operations on a node (e.g., prohibit indexed access to a node that has at most one node collection element).

TABLE 2

Examples of the Cardinality of a Node Collection

| Value | Properties |
|---|---|
| 0 . . . 1 | node collection can be empty, contains at most one element |
| 1 . . . 1 | node collection always contains exactly one element. |
| 0 . . . n | node collection can be empty or contain any number of elements |
| 1 . . . n | node collection always contains at least one element. |

The content of a node collection can be determined in various ways.

The node values of independent nodes can be set by initializers, event handlers, or supply functions. A supply function can be called when a node is accessed. A node is accessed, for example, when the node is queried for its data by application code or by a user interface element that is bound to the node.

Dependent nodes can get their values by using a supply function. For example, the node collection of a dependent node can become obsolete when a selection of its parent node changes (i.e., when a different element is selected from the node collection corresponding to the parent node). In this scenario, the dependent node can be recalculated, that is, the content of its node collection can be determined, on a subsequent access. In another example, a representation instance is created for each dependent node of a parent node. The values of the representation instances are calculated when the corresponding parent node is accessed. In other words, using representation instances enables a "load data on demand" or a "unload data when not needed" mechanism. In this manner, memory can be used in an efficient manner.

The content of a node collection can also be explicitly set to a certain state, such as "invalid" or "unfilled". When the node that corresponds to the node collection is subsequently accessed, the node collection content is determined again. This can be used to force a re-read of modified data when the modification (e.g., in the model) was not visible to the application runtime.

Figure 7:
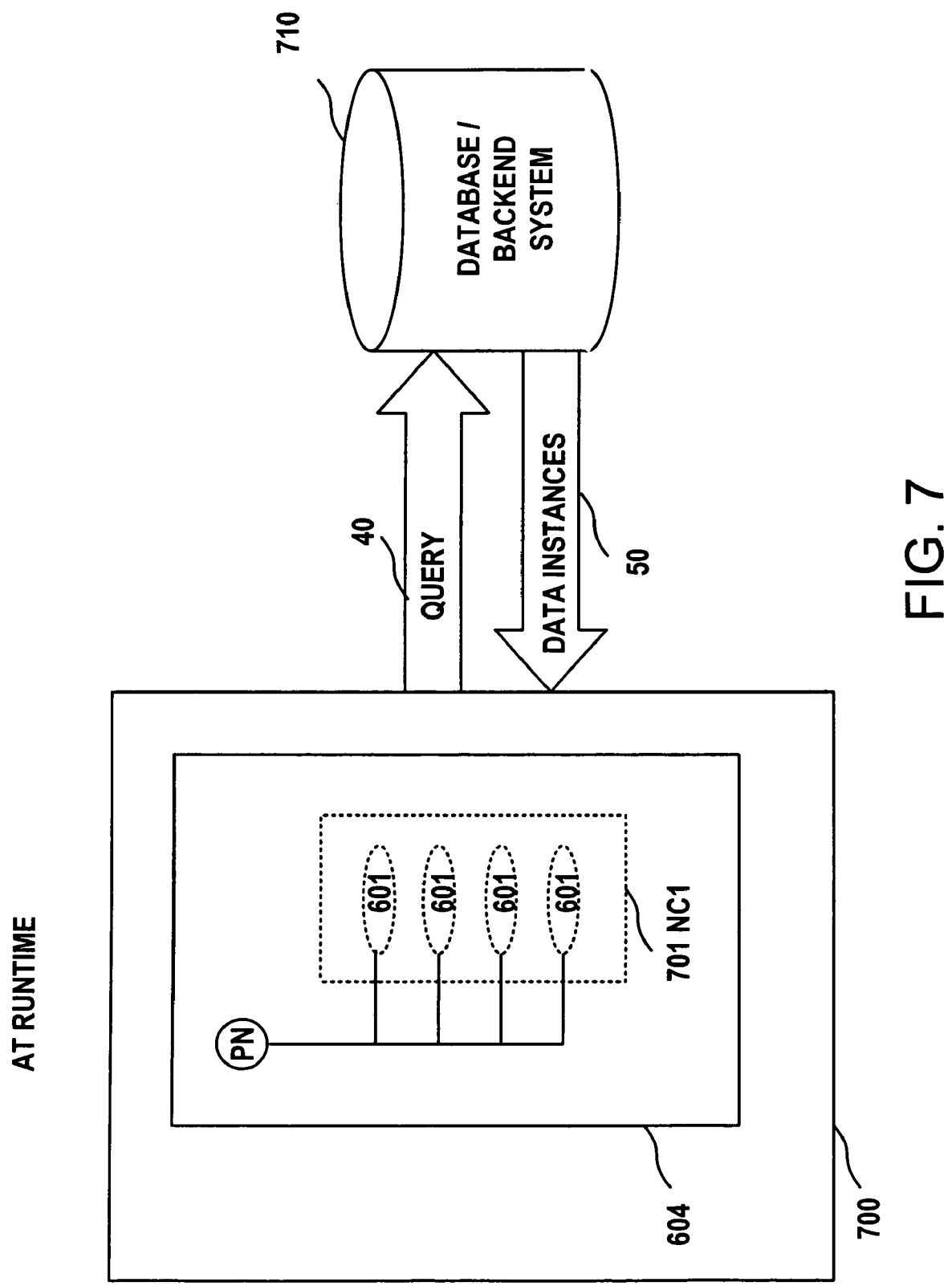
FIG. 7 illustrates a context at runtime as a set of data instances.

FIG. 7 illustrates the context 604 at runtime as a set of data instances. The nodes of the context at runtime represent a system-managed set of data instances (e.g., a java.sql-.RecordSet). The data instances can be provided 50, for example, from a database or backend system 710 in response to a query (e.g., a structured query language (SQL) query) that is sent 40 from the computer system 700 to the database/backend system 710 when a node is accessed, for example, by an application. Examples of backend systems include Enterprise Resource Planning systems, Customer Relationship Management systems, and web server systems providing web services or any other system that stores application data. Accessing a node can lead to a request for data from a corresponding model. This can result in a corresponding query request from the model to a database/backend system 710.

Nodes provide type information about object instances that are maintained by the node. The type information can be derived from a model. For example, if a parent node PN corresponds to a customer, its child node collection 702 (shown in the example in FIG. 6) can include all orders for that customer. When an application accesses the parent node PN (which represents the customer), the computer system 700 can send 40 a query to retrieve all orders of the customer from the corresponding database/backend system 710, such as a sales and distribution (SD) system or a customer relationship management (CRM) system. The retrieved orders (data instances) are then returned 50 to the computer system 700 to fill the corresponding data of elements of the node collection 702 in the context 604.

Figure 8:
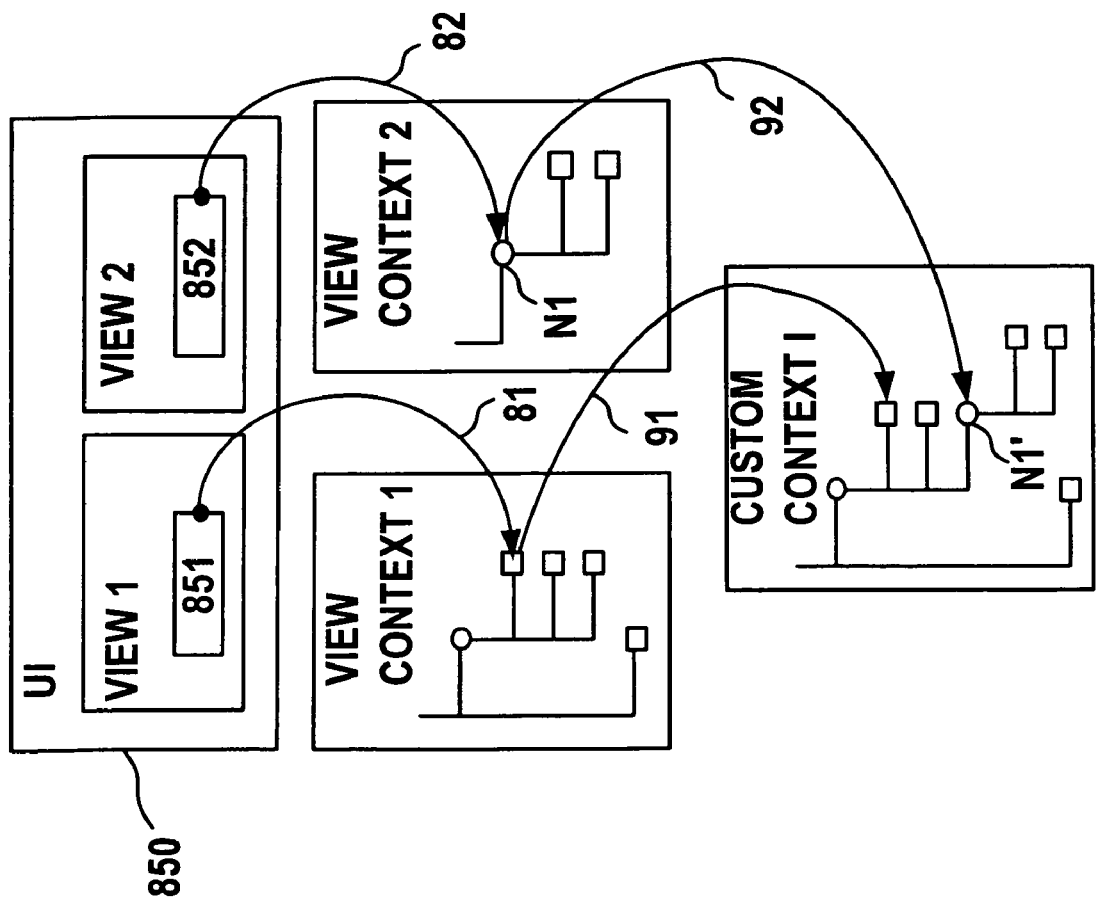
FIG. 8 illustrates mappings between contexts.

FIG. 8 illustrates mapping of contexts according to the present invention.

Because UI elements (e.g., UI elements 851, 852) of views (e.g., VIEW 1, VIEW 2) that are used in a user interface (UI) 850 bind 81, 82 to view contexts (e.g., VIEW CONTEXT 1, VIEW CONTEXT 2) and long persisting data can reside in custom contexts (e.g., CUSTOM CONTEXT I), one implementation of components 200 enables mapping 91, 92 of nodes and attributes of view contexts or custom contexts to nodes and attributes of custom contexts. In other words, nodes and attributes of view contexts or custom contexts can reference type-compatible nodes and attributes in other custom contexts. Nodes can also be mapped to other nodes within the same context. Node mapping reduces the need for copying data between several contexts by enabling a node N1 of a first context (e.g., a view context, such as VIEW CONTEXT 2, or a custom context) to reference 92 a node N1' of a second context (e.g., a custom context, such as CUSTOM CONTEXT I, or an application context), where the node N1' of the second context has or references the data. The same is true for attributes.

Therefore, the data can be manipulated in a custom context or application context and each view context that references the custom context or application context provides its view with the current data stored in the corresponding context. Mapping contexts can span multiple context levels. That is, a custom context can reference a further custom context. Therefore, context hierarchies can be created (see FIG. 7).

For example, related data can be collected in a dedicated custom context. The binding to this data is implemented by using a view context that is mapped to the custom context accordingly.

As described above, a component encapsulates one or more controllers, a controller generally has an associated context, and a context is a data structure of data elements. Data elements are bound by data mappings. The term data mapping will be used to refer to either a context mapping or a model mapping. A data mapping is a context mapping if the data source for the data element is another data element, and a data mapping is a model mapping if the data element is a model node deriving its value from a model. Each model mapping specifies a model and a supply function referring to the specified model.

In one implementation of a development environment, datalinks are used to visualize data dependency relationships between a controller and another controller or a model. Each datalink indicates a direction of the data dependency for the controller and represents all the data mappings in the indicated direction. In one implementation, the datalink is represented as a directed arrow, the head of the arrow indicating the source of the data and the tail of the arrow indicating the controller that is dependent on the source of the data.

Figure 9A:
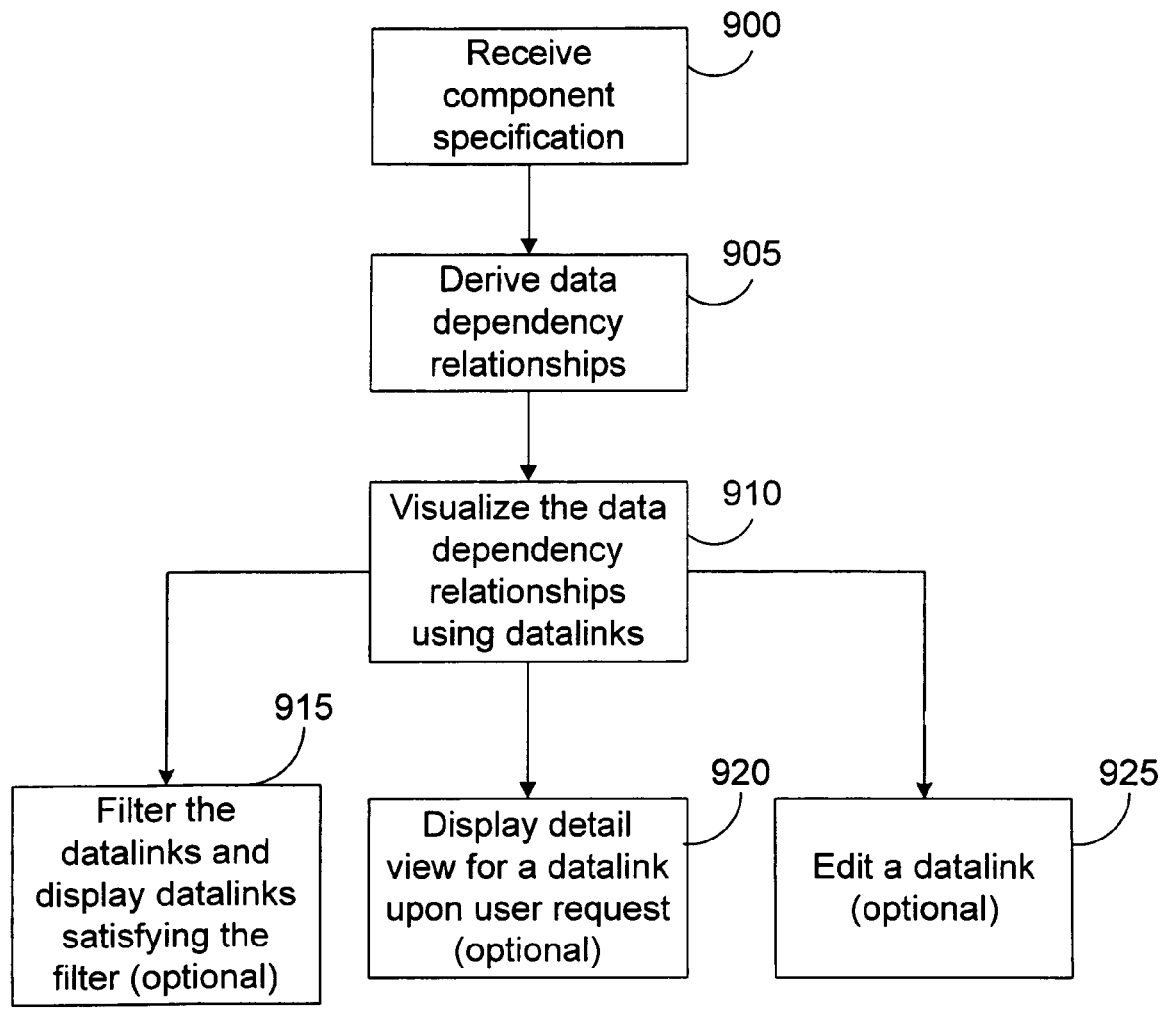
FIG. 9a is a flow diagram illustrating a method for visualizing data dependency relationships using datalinks.

FIG. 9a is a flow diagram illustrating a method for visualizing the data dependency relationships that can be implemented in a data processing system. A specification of the component is received, including all the data mappings for the component (step 900). The data dependency relationships for the component are derived from the data mappings (step 905). A data dependency relationship in a direction exists between two controllers if there is at least one data mapping in the direction between the associated contexts of the two controllers. A data dependency relationship exists from a controller to a model if there is at least one model node in the associated context of the controller and a value of the model node is derived from the model. Multiple data mappings in a direction are represented as a single data dependency relationship in the direction. The data dependency relationships are visualized by displaying a datalink for each data dependency relationship (step 910). Each datalink shows the direction of data dependency.

For complex data dependency relationships having a large number of datalinks, a user can optionally filter the datalinks using different filters, and the filtered datalinks can be visualized (step 915). For example, a user can display all the datalinks between a number of user selected models and controllers. In an alternative example, the user can display all the datalinks having a selected model or controller as the source or the selected controller as the destination. In one implementation the user specifies filters for the data mappings, the filtered data mappings satisfying the filter are used to derive filtered datalinks, and the filtered datalinks are visualized. For example, the data mapping filters can specify all data mappings having selected models or controllers as the data source. In an alternative example, the data mapping filters can specify all data mappings having a selected model or controller as the data source, and all data mappings specifying a data source for the selected controller.

Figure 9B:
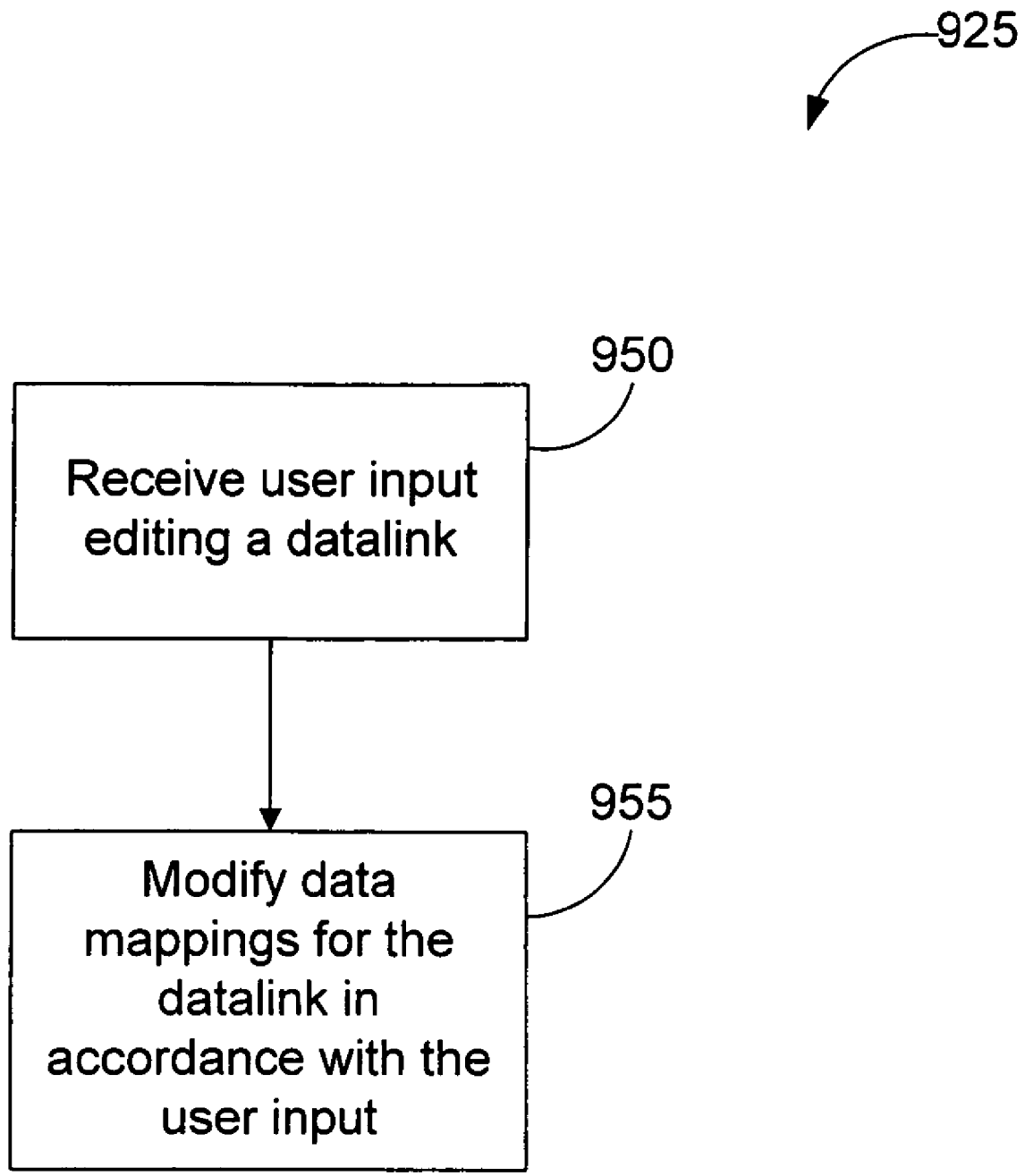
FIG. 9b is a flow diagram illustrating a method for editing a datalink.

A user can optionally edit a datalink to modify the data dependency relationship represented by the datalink (step 925). FIG. 9b is a flow diagram illustrating a method for editing a datalink. User input is received editing the datalink (step 950), and the data dependency relationships specified by the datalink are modified in accordance with the user input (step 955). The data dependency relationships are modified by modifying the data mappings represented by the data dependency relationship. The user can change the direction of the data link thereby changing the direction of the data dependency. The user can also move the source end of the datalink from one controller to another controller or from one model to another model. If the source end is moved from one controller to another controller, the data mappings are modified to map to the associated context for the second controller. If there is more than one option for the modified data mapping, all the possible data mappings are displayed and the user is prompted to select the desired data mapping. If the source end is moved from a model to another model, the data mapping is modified to refer to the second model. If the second model does not support the supply function used by the data mapping, the user is prompted to provide a new supply function for the modified data mapping.

A user can optionally request that a detail view be displayed for a datalink (step 920). For a datalink between two controllers, the detail view displays all the context mappings between associated contexts for the two controllers. For a datalink between a controller and a model, the detail view displays the supply functions referring to the model for all the model nodes in the associated context of the controller.

Figure 10:
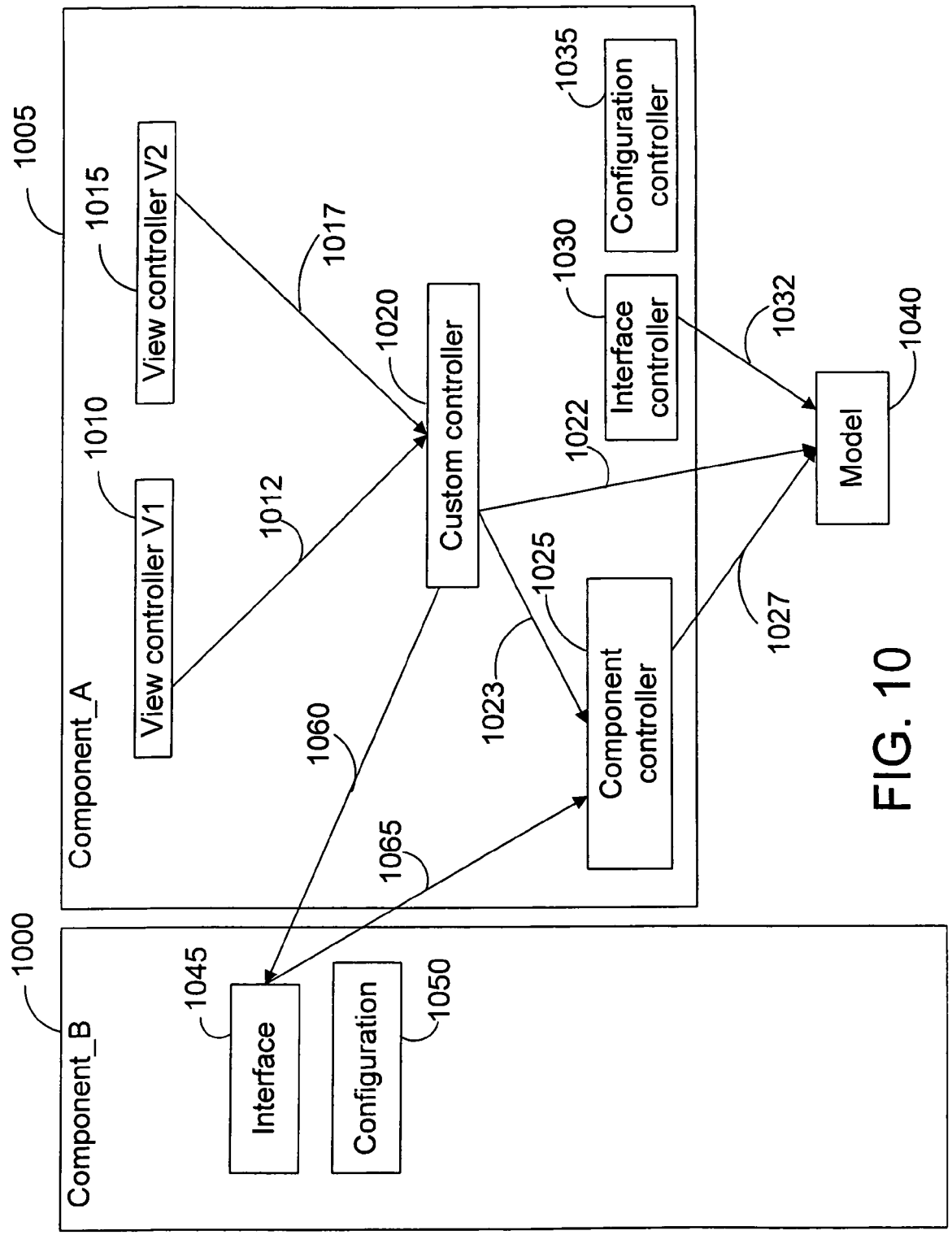
FIG. 10 is a visualization diagram showing datalinks for a component.

FIG. 10 is a visualization diagram illustrating the data dependencies for a component. The component Component_A 1005 has two view controllers V1 1010, and V2 1015. Component_A 1005 has a custom controller 1020, and a component controller 1025. The programming interface for Component_A 1005 includes an interface controller 1030 and a configuration controller 1035. The view controllers V1 1010 and V2 1015 have data dependency relationships with the custom controller 1020 as indicated by the datalinks 1012 and 1017. The custom controller 1020 has data dependency relationship with the model 1040, indicated by the datalink 1022. The component controller 1025 has a data dependency relationship with the model 1040, indicated by the datalink 1027. The custom controller 1020 has a data dependency relationship with the component controller 1025, indicated by datalink 1023. The interface controller has a data dependency relationship with the model 1040, indicated by datalink 1032.

The visualization diagram can be used to visualize data dependency relationships between multiple components. In FIG. 10, Component_B 1000 is a component that is embedded by Component_A 1005. Component_B 1000 includes an interface controller 1045 and a configuration controller 1050. Datalink 1060 indicates a data mapping from the custom controller 1020 to the embedded component's interface controller 1045. Datalink 1065 indicates a data mapping from the embedding component's interface controller 1045 to the component controller 1065. A data mapping from an embedded component to an embedding component is referred to as a reverse mapping.

Figure 11:
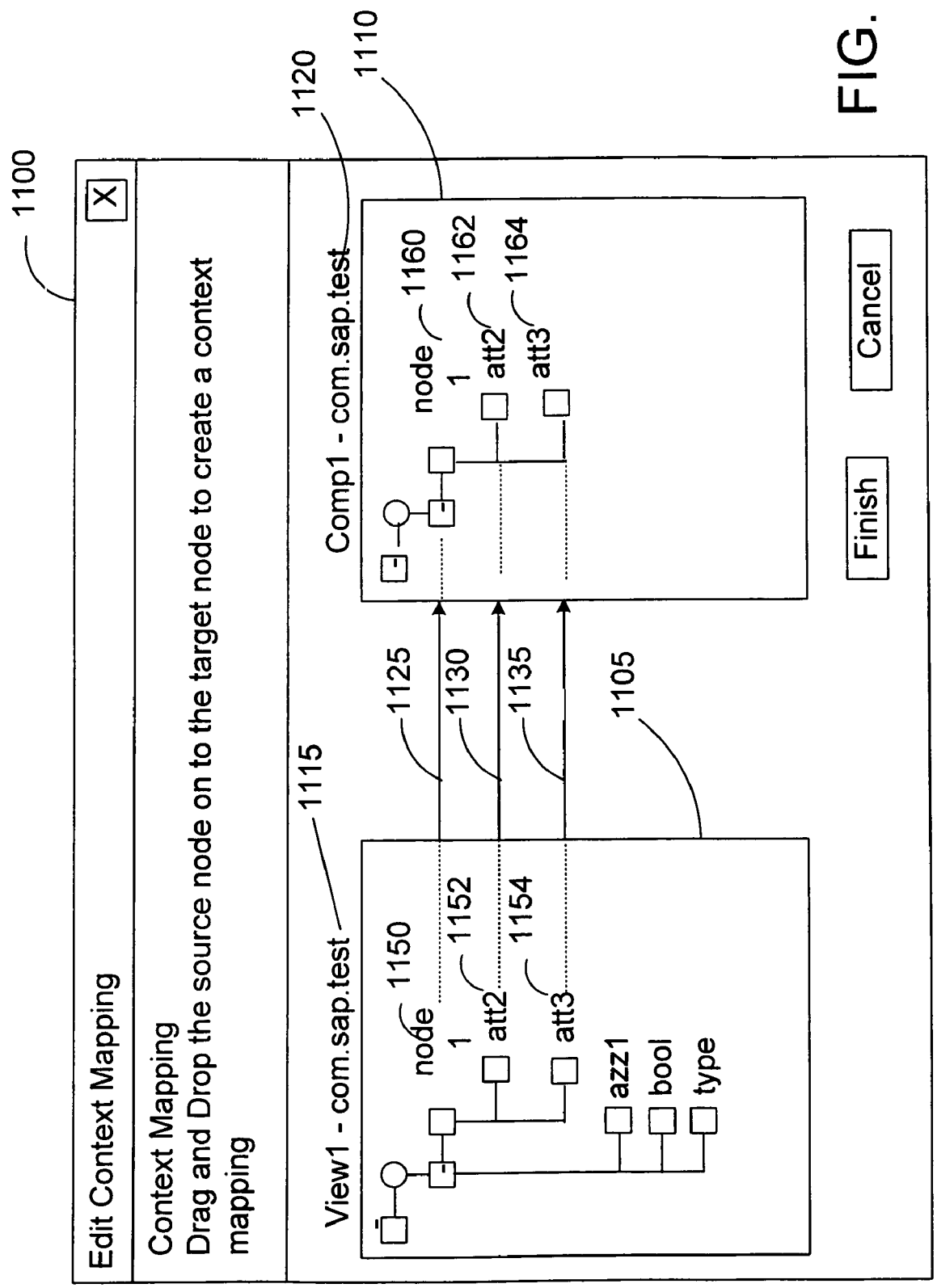
FIG. 11 is an example of a user interface that is used to display and edit datalinks.

FIG. 11 is an example of a user interface 1100 that is used to display a detail view for a datalink and to edit a datalink. The user interface 1100 shows a view controller context 1105 associated with a view controller View1 1115 and a controller context 1110 associated with a component controller Comp1 1120. The user interface 1100 is displayed when a user requests a detail view for a data link between the view controller View1 1115 and the component controller Comp1 1120. The user interface 1100 displays nodes and attributes contained in the view controller context 1105 and the component controller context 1110. In addition, the user interface 1100 displays the data mappings between the two contexts. Each data mapping is represented by an arrow, where the direction of the arrow shows the direction of the data mapping. For example, the arrow 1125 indicates a data mapping from a node (node1 1150) of view context 1105 to a node (node1 1160) of controller context 1110. The arrow 1130 indicates a data mapping from an attribute (att2 1152) of view context 1105 to an attribute (att2 1162) of controller context 1110. The arrow 1135 indicates a data mapping from an attribute (att3 1154) of view context 1105 to an attribute (att3 1164) of controller context 1110.

The user interface 1110 is optionally used by the user to edit the datalink between the view controller View1 1115 and the component controller Comp1 1120. The user can edit the datalink by editing the data mappings between the view controller context 1105 and the controller context 1110. For example, the user can create a new data mapping using conventional drag and drop operations to drag a node or attribute from one context to a node or attribute of the other context displayed in the user interface 1100. As another example, the user can also delete a selected data mapping displayed in the user interface 1100.

Creating contexts at design time can be difficult and time-consuming, especially if the context to be created has a complex structure (e.g., a deeply nested structure with many levels of nodes and attributes). Moreover, specifying mappings between the context elements and elements in another context, as well as bindings between the context elements and source structures in a model, can be a difficult process for a user who does not have detailed knowledge about the underlying concepts.

A context building tool can be used to facilitate the building of contexts. The context building tool can be used to create a new context ("source context") by copying the structure of an existing context ("target context"), modifying the properties of the new context, and specifying mappings between the new context and the existing context.

Figure 12A:
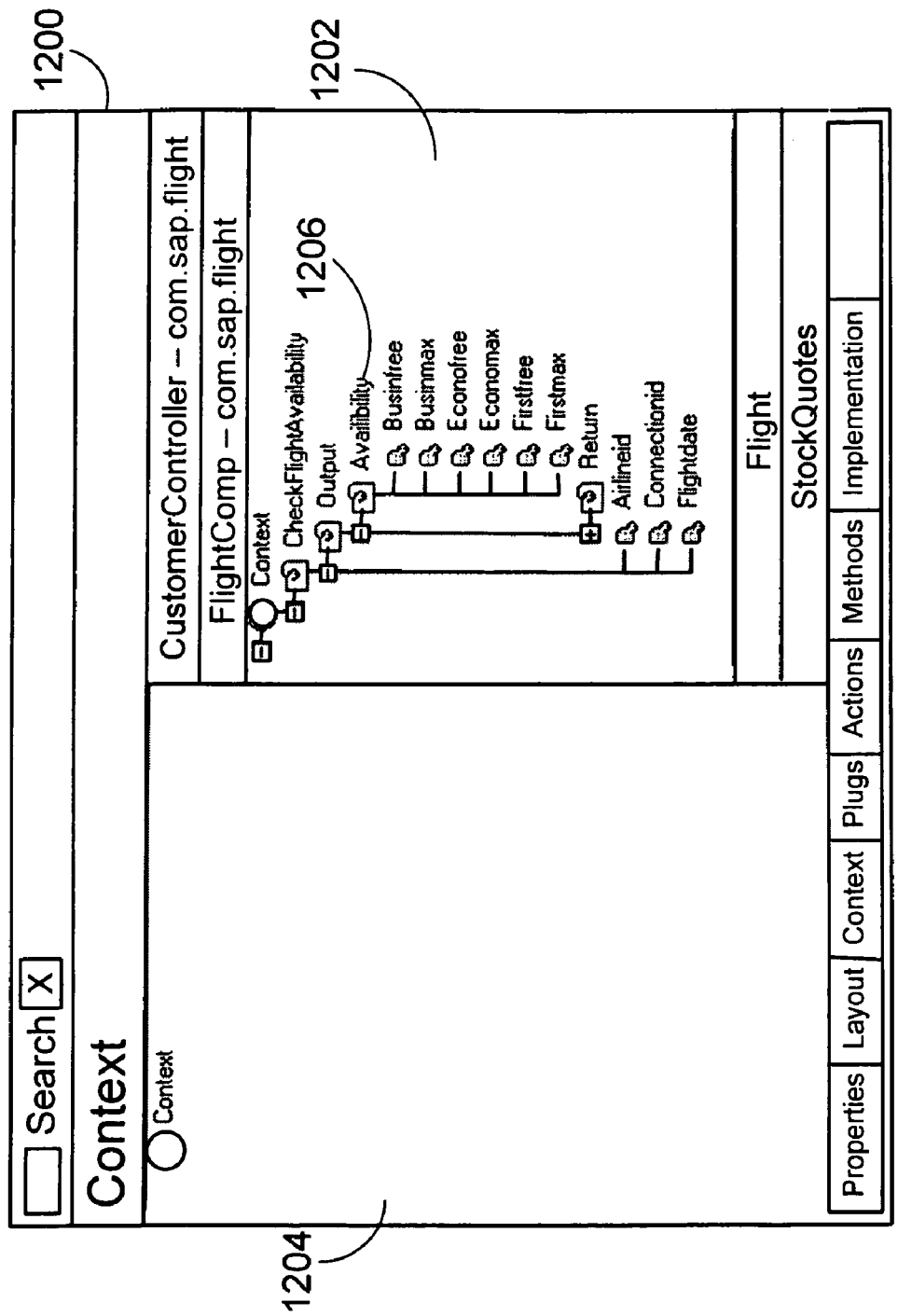
FIGS. 12a-f illustrate interfaces of a context building tool used to facilitate the building of a context from an existing context.

In the example of FIG. 12a, the context building tool displays, in a target window 1202 of a context building tool interface 1200, all the contexts bound to controllers associated with reusable components (e.g., components 115, 120, 125) stored in a component repository 110. In an alternative example, the context building tool displays all the contexts associated with a selection of components specified by a user in the target window 1202.

The context building tool is implemented to receive user input that specifies a target context to be used as a target for a building operation. The user input may be provided using a pointing device that is used to move a cursor displayed on the context building tool interface 1200. In one example, the user selects a target context by dragging a context element (e.g., the Availibility node 1206) of the target context from the target window 1202 to a source window 1204. If the user drags and drops an attribute, only the attribute is created in the new source context. If the user drags and drops a node, the node is used as a root node in a context building operation. That is, the user-selected node and all of its child elements are created in the new source context with a single drag-and-drop operation. In so doing, the context building tool can be used to create a duplicate of a context or a portion of a context as desired.

Figure 12B:
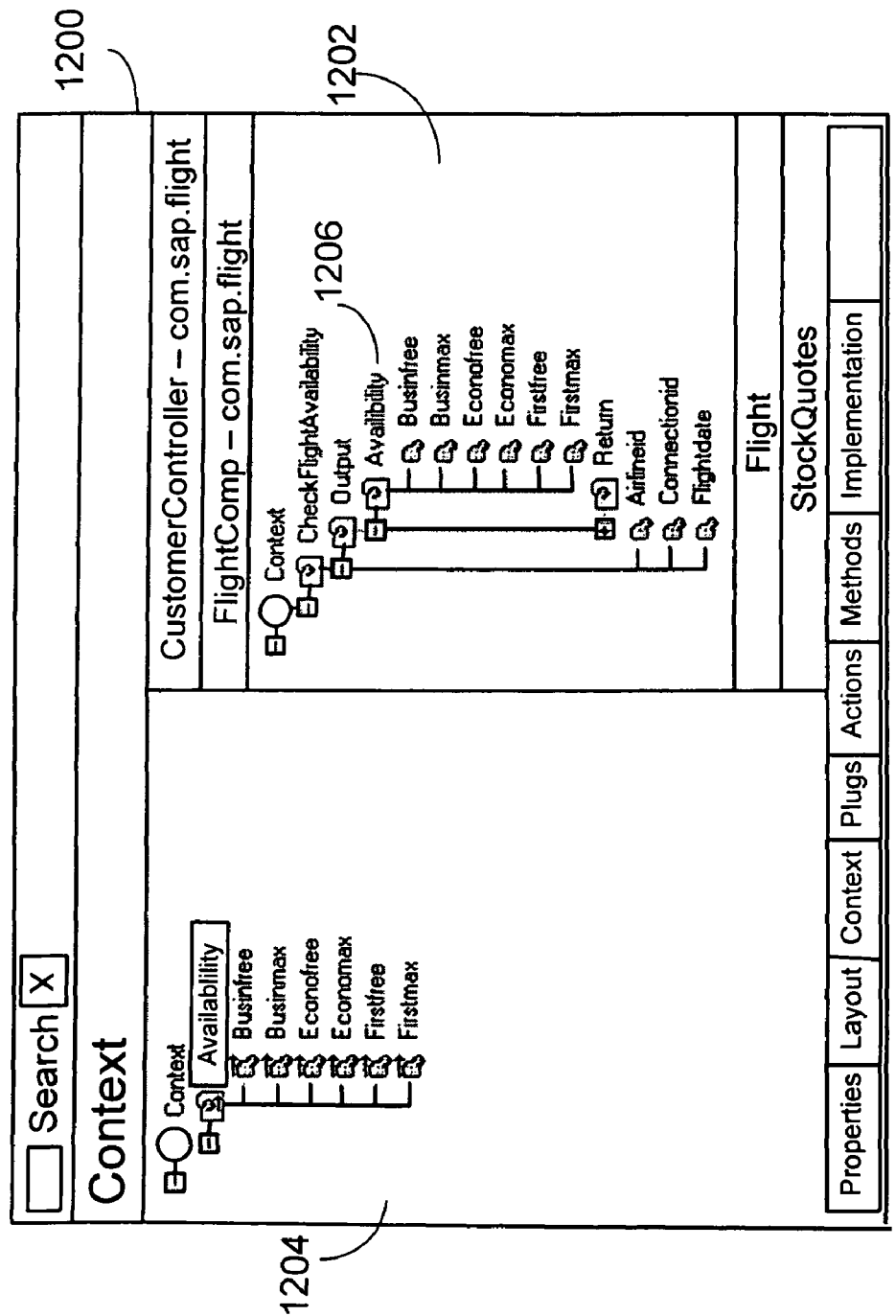

The context building tool receives a specification of the target context corresponding with the user-selected context element (i.e., the Availibility node 1206) when the context element is dropped in the source window 1204 and generates a source context having a structure based on the specification of the target context. In one implementation, the default operation of the context building tool is to create a representation of a source context structure in real-time whose nodes and attributes map to the nodes and attributes in the target context, as shown in FIG. 12b. The user can optionally modify the context mappings under the guidance of a wizard.

Figure 12C:
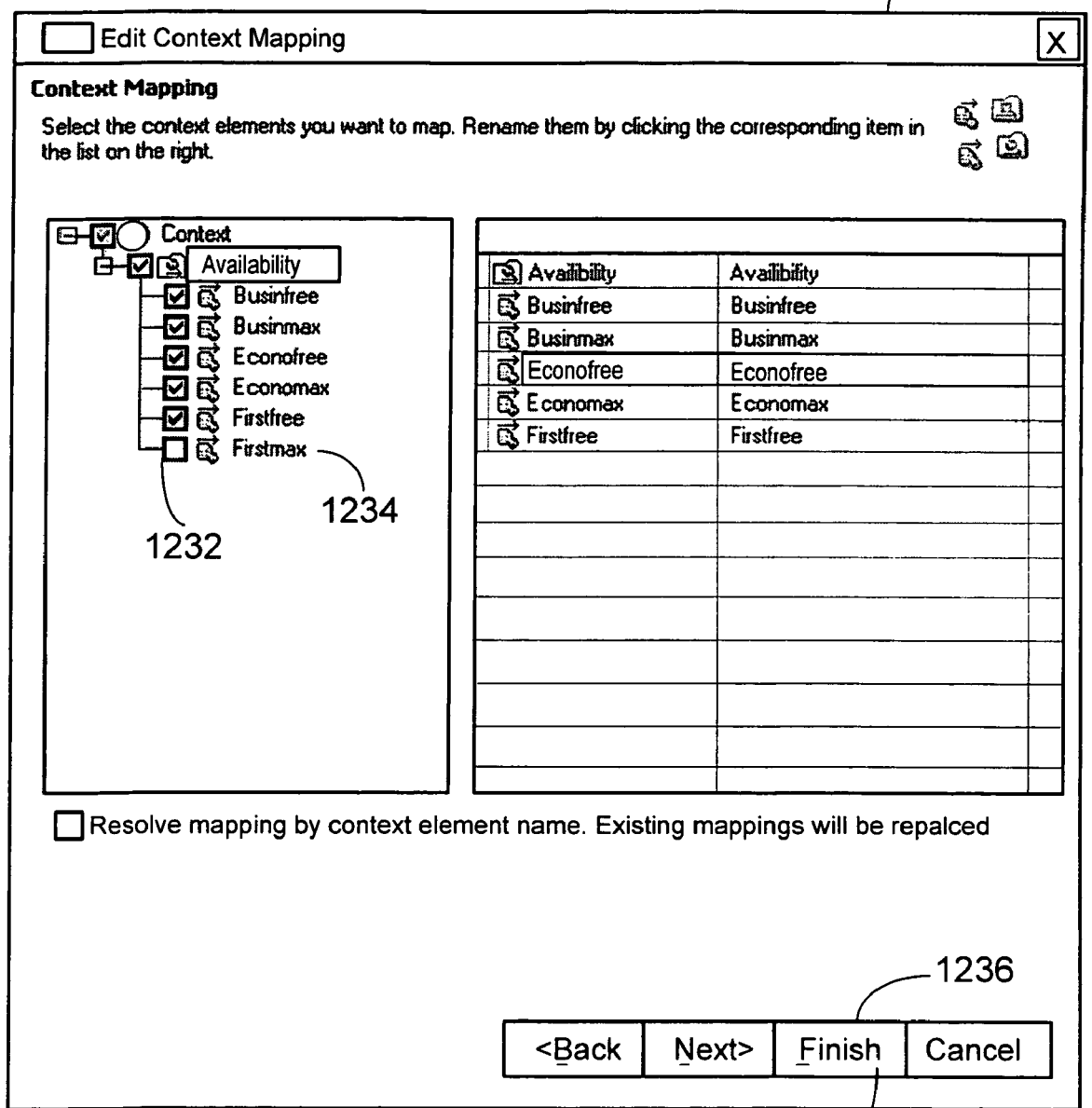

To launch the wizard, the user selects a "Create Context Mapping" function from a pull-down menu provided on the context building tool interface 1200. FIG. 12c is an example of a context building wizard interface that is displayed in response to a user request to specify/modify the context mappings of a source context. The user can move forwards and backwards through a sequence of dialog boxes or pages filling in the details as required. As shown in FIG. 12c, the user can add, remove and/or rename nodes and attributes. The user can also edit the mappings to map the context elements of the source context to context elements of a context other than that of the target context, or delete the mappings altogether, so that the source context is unmapped. In the example shown in FIG. 12c, the user has unchecked the box 1232 next to the "Firstmax" node 1234. This action indicates to the context mapping tool that the user desires to remove the "Firstmax" node 1234 from the source context. Once the user is satisfied with the specification of the source context, the user can click on a "Finish" button 1236 displayed on the context building wizard page 1230 to complete the building operation. In one implementation, this causes the context building tool to store the specification of the source context in a component repository 110.

Figure 12D:
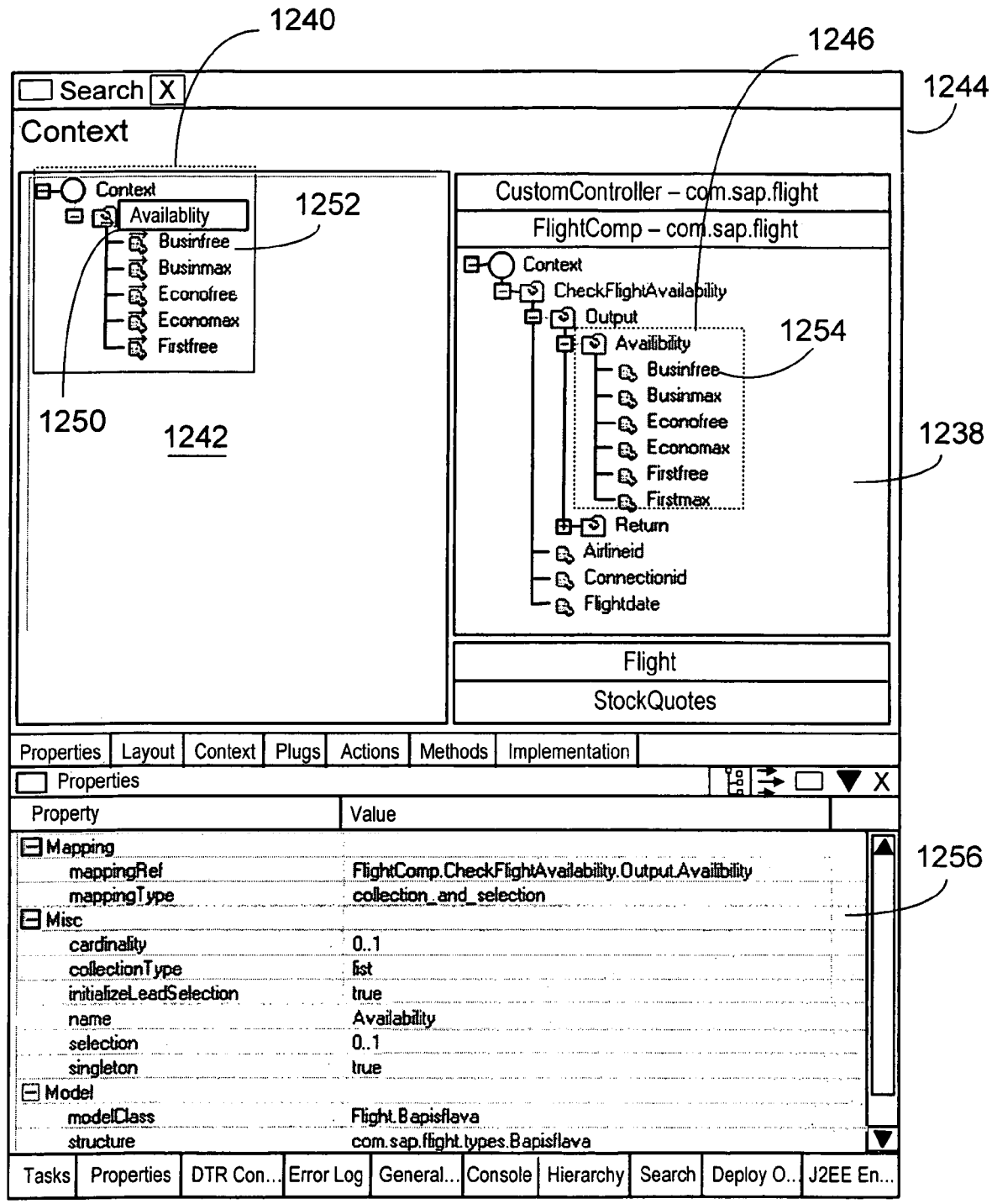

The context building tool can be implemented to display the result of the building operation in the context building tool interface 1244. As shown in FIG. 12d, the source context 1240 (modified by the user under the guidance of the wizard to exclude the "Firstmax" node) is displayed in a source window 1242 on the left-hand side of the context building tool interface 1244. The target context 1246 to which the source context 1240 is mapped is displayed in a target window 1248. Each context mapping is represented by an arrow, where the direction of each arrow shows the direction of the context mapping. For example, the arrow 1250 indicates a context mapping from the "Businfree" node 1252 of the source context 1240 to the "Businfree" node 1254 of the target context 1246. If desired, the user may drag and drop a context element of the source context 1240 on a context element of the target context 1246 to modify an existing context mapping. The context mapping of each context node and attribute of the source context 1240 is shown in a property window 1256. In one implementation, the property window 1256 also displays property information about a selected node or attribute of the source context 1240, and lets the user edit such information.

Figure 12E:
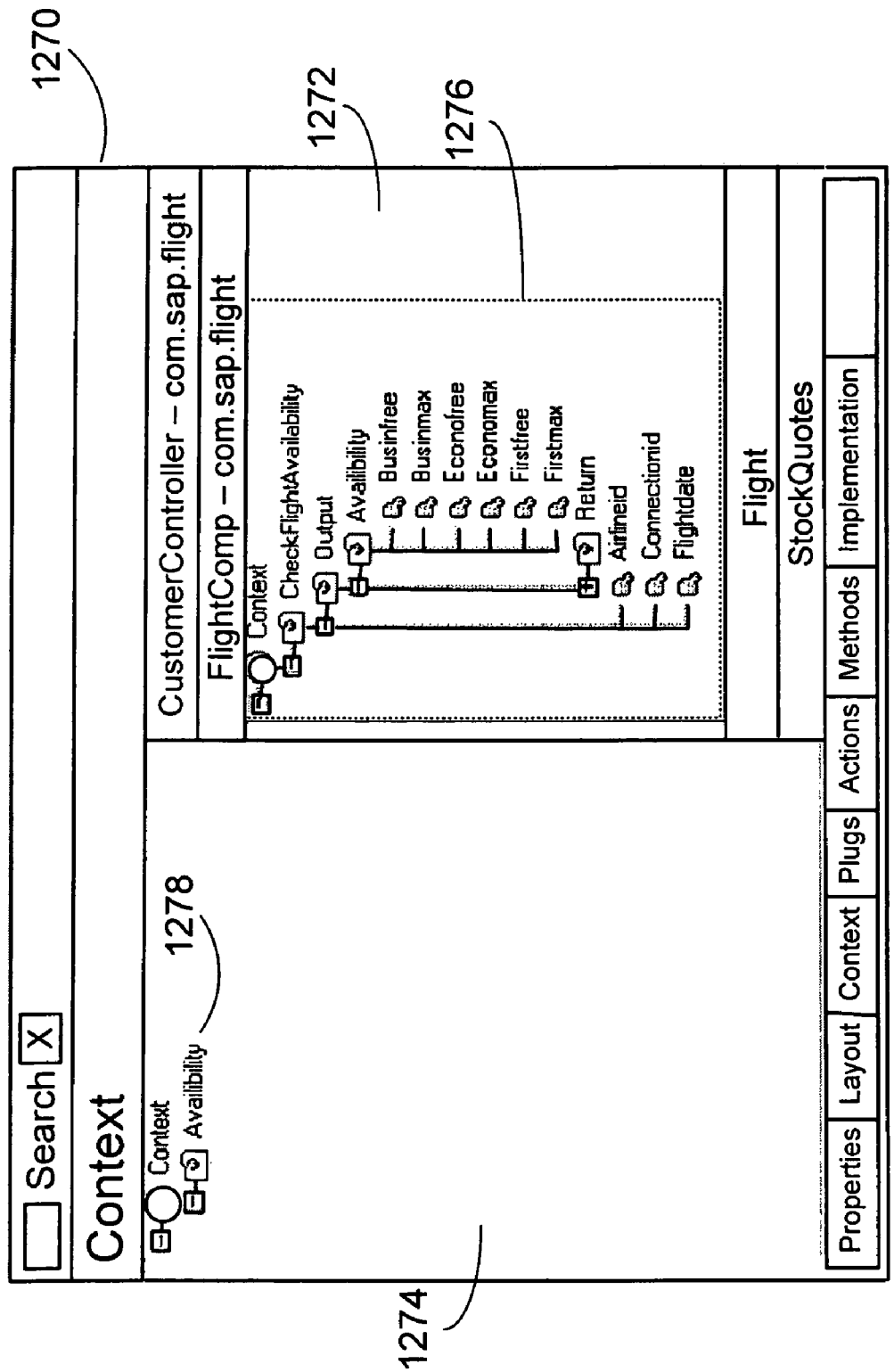
Figure 12F:
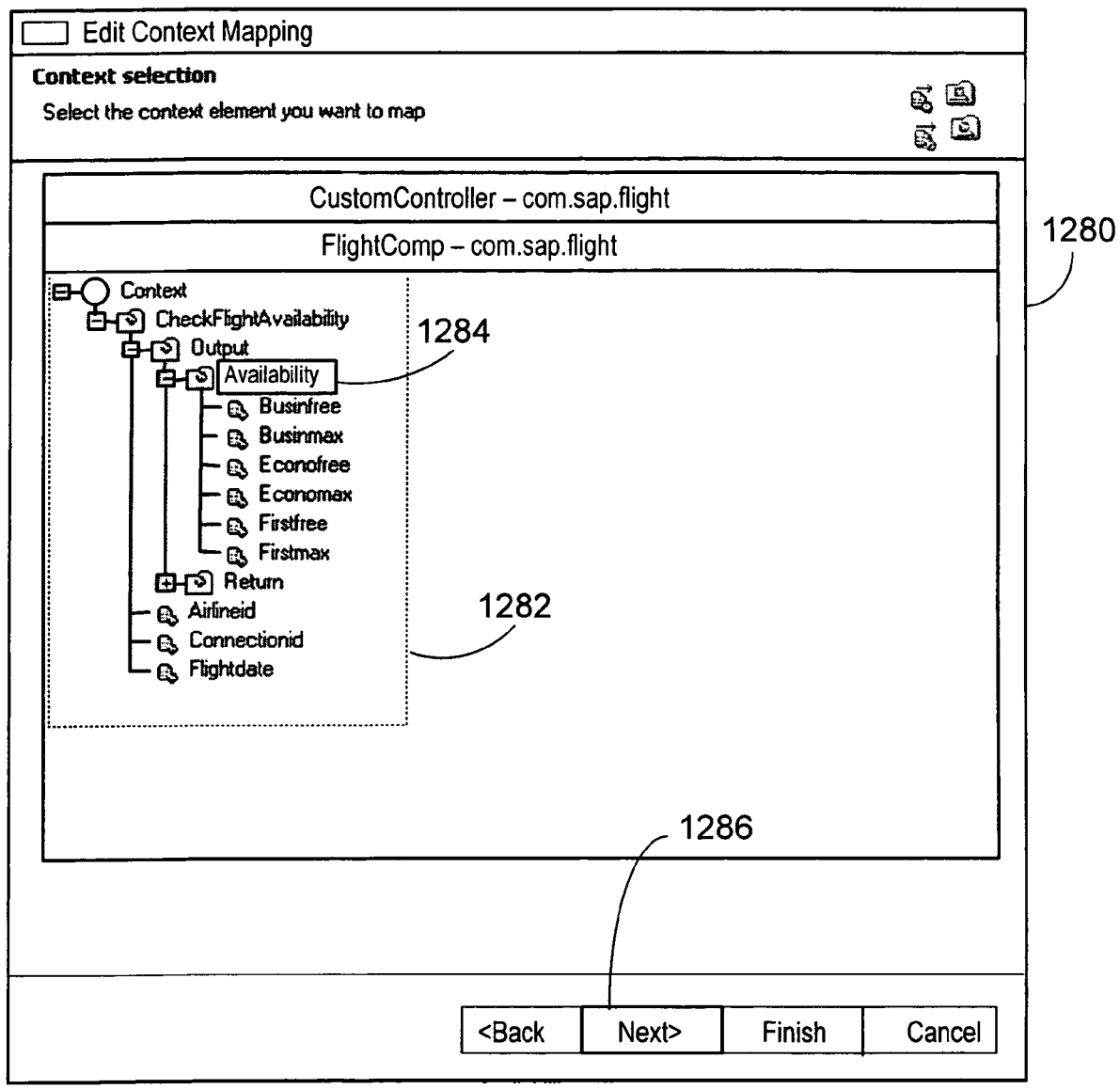

In another example, the user creates an initial source context element (e.g., Availability node 1278) in the source window 1274 as shown in FIG. 12e. The user can then "right-click" on the Availability node 1278 and select a "build" function from a pull-down menu displayed on the context building tool interface 1270. This action causes the context building tool to launch a context building wizard page 1280 (FIG. 12f) that displays all the target contexts 1276 associated with a selection of components specified by a user in the target window 1272 (FIG. 12e). As shown in FIG. 12f, the user can select the target context 1282 to which the user desires the initial source context element be mapped by highlighting a context element (e.g., Availibility node 1282) and clicking on the "Next" button displayed on the context building wizard page 1280. The context building tool then provides wizard pages in which the user can specify/modify the context mappings as described above.

A context building tool can also be used to create a new context based on an existing model. The context building tool can be used to generate a structure for the new context that corresponds to the structure of the existing model, modify the properties of the new context, and specifying bindings between the new context and the existing model.

Figure 13A:
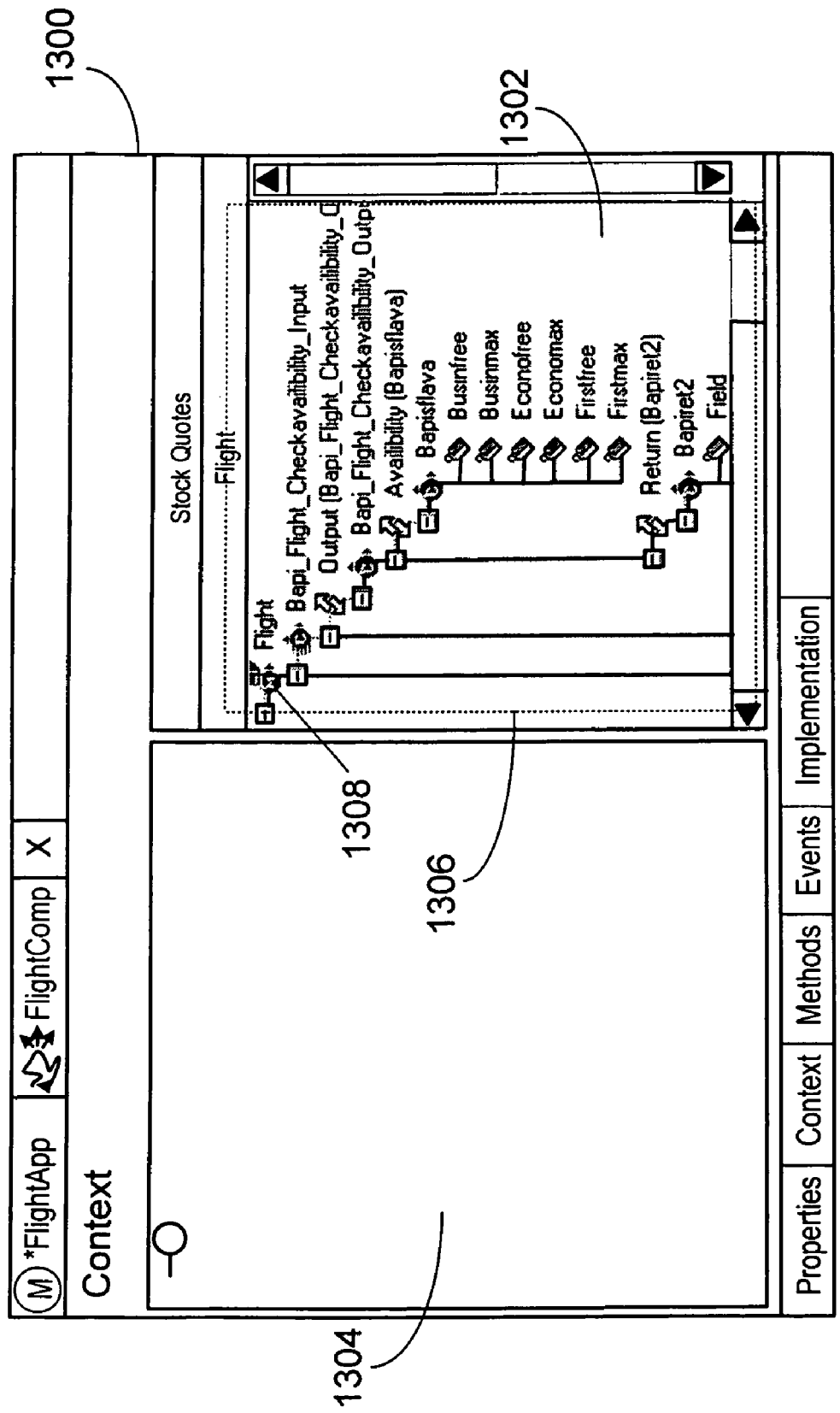
FIGS. 13a-f illustrate interfaces of a context building tool used to facilitate the building of a context from an existing model.

In the example of FIG. 13a, the context building tool displays, in a context building tool interface 1300, all the models associated with the reusable components (e.g., components 115, 120, 125) stored in the component repository 110. In an alternative example, the context building tool displays all the models associated with one or more user-selected reusable components in the context building tool interface 1300.

The context building tool receives user input selecting a model class or model class property for use in a context building operation. The user input can be provided using a pointing device that is used to move a cursor displayed on the context building tool interface 1300. In one example, the user selects a model, by dragging an element (e.g., a model class or a model property) of the model from a model window 1302 to a context window 1304. If the user drags and drops a model property, only a context attribute is created in the new source context. If the user drags and drops a model class, a context node corresponding to the user-selected model class is used as a root node in a context building operation. That is, the context nodes and attributes corresponding to the user-selected model class and all of its child elements (i.e., model class properties and model relations defined for the selected model class) are created in the new source context with a single drag-and-drop operation. In so doing, the context building tool can be used by a user to create a context or a portion of a context corresponding to a model class as desired.

Suppose, for example, that the user drags the root node 1308 of the model 1306 from the model window 1302 and drops it in the context window 1304. The context building tool receives a specification of the model that defines the structure for a model associated with a component, and generates a context having a structure based on the specification of the model. Initially, the generated context structure has nodes and attributes that reference elements of the model to which it is bound. Each context node in the generated context structure references a model class and optionally a model relation role in the user-selected model and each context attribute references a model class property. As different model relations can reference identical model classes, the context building tool can provide (as part of the specification of the context) a supplying model relation role that is identical to the endpoint of the corresponding model relation. Use of a model relation role (i.e., endpoint) to define dependencies between context nodes is advantageous because in a situation where either side of the model relation can be used (e.g., bidirectional relations), use of the relation role provides a directed relation to ensure the proper direction is followed. The context building tool can be implemented to name the context nodes and context attributes based on the corresponding model classes and model class attributes.

Figure 13B:
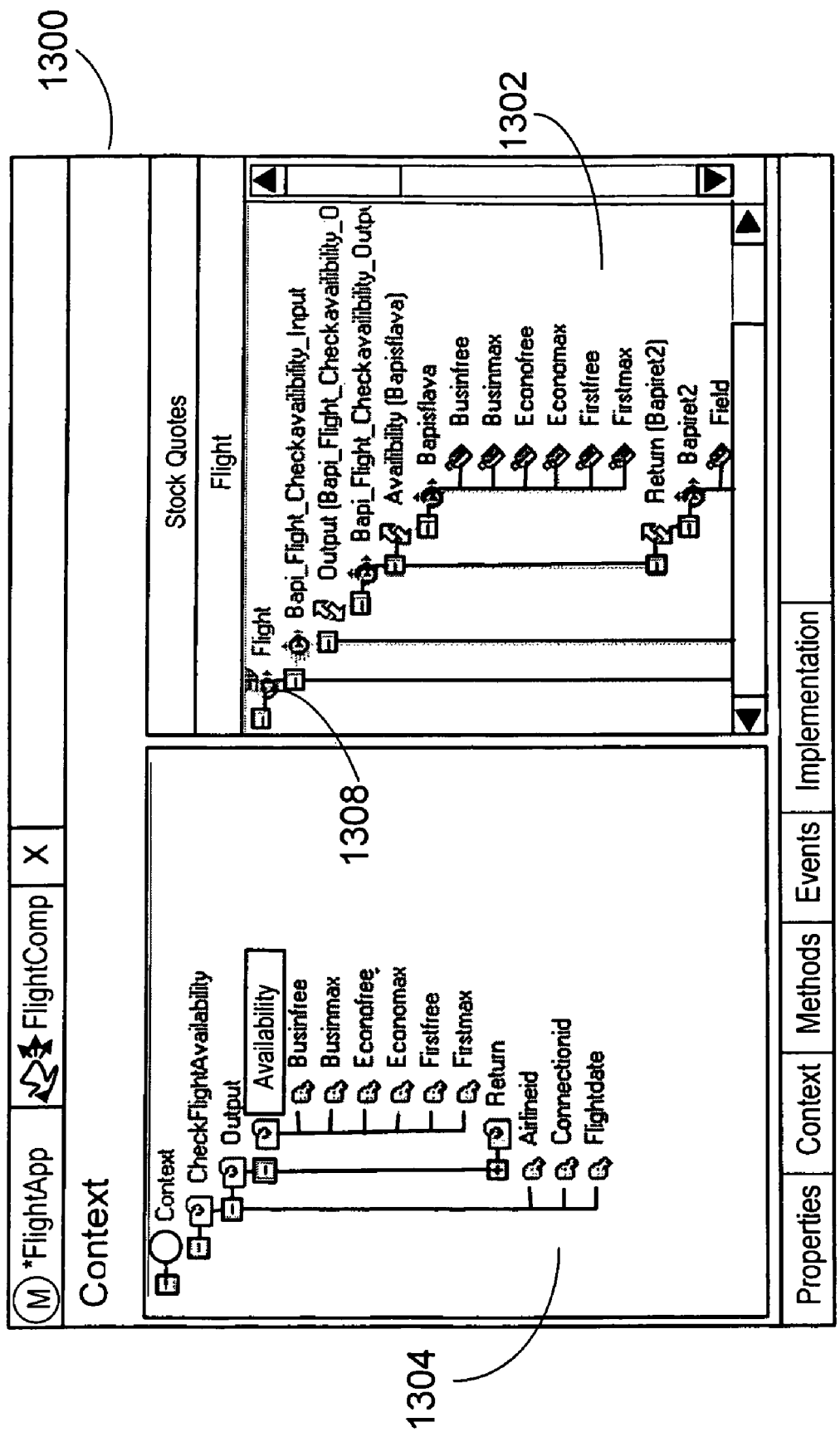

In one implementation, the default operation of the context building tool is to create a representation of the context structure in real-time, as shown in FIG. 13b. The user can optionally modify the model bindings under the guidance of a wizard.

Figure 13C:
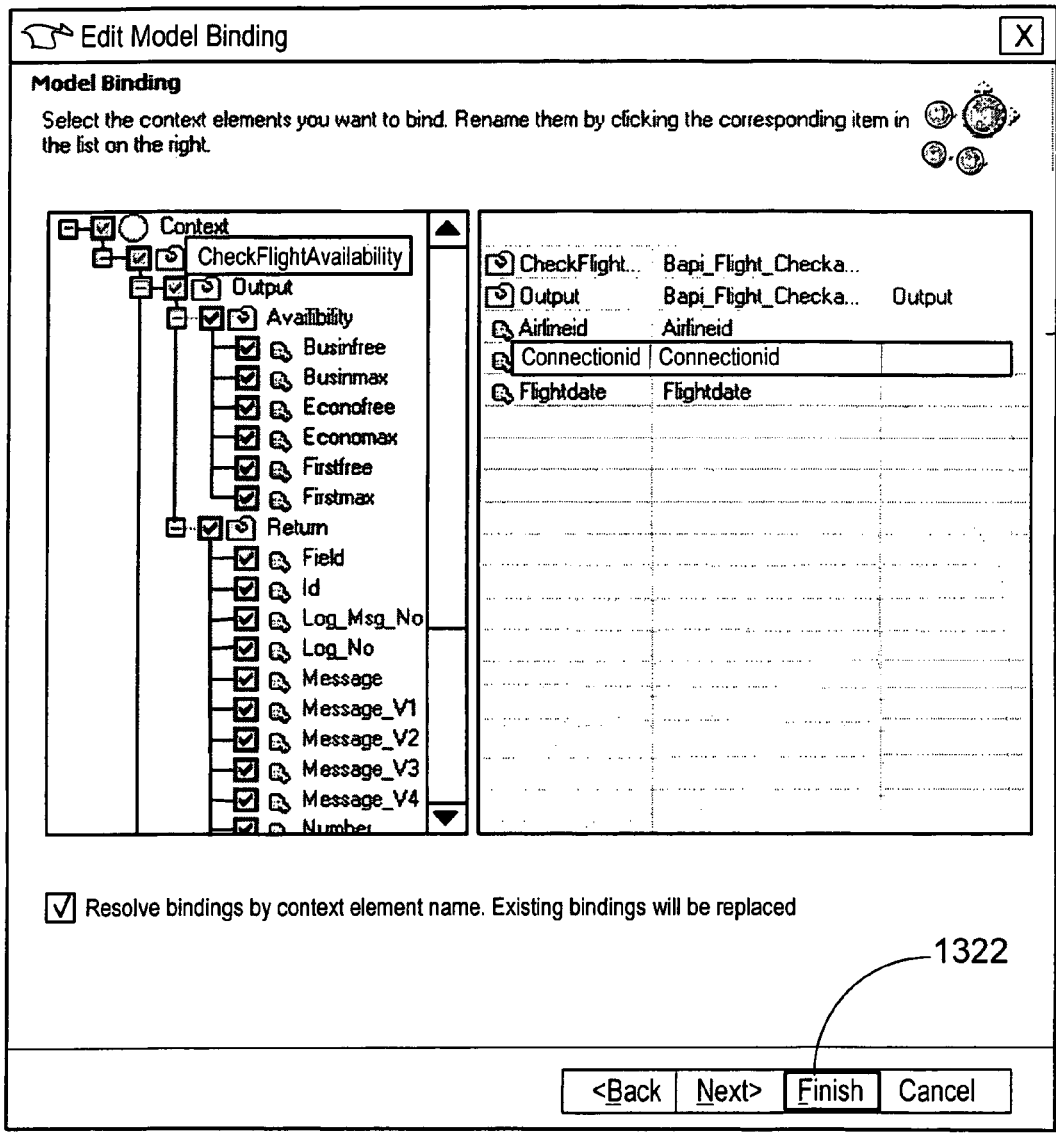

To launch the wizard, the user selects a "Create Model Binding" function from a pull-down menu provided on the context building tool interface 1300. FIG. 13c is an example of a context building wizard page 1330 that is displayed in response to a user request to modify the model bindings of a context. The user can add, remove and/or rename nodes and attributes of the generated context structure. The user can also edit the model bindings to bind the context elements to elements of a model other than that of the user-selected model from which it was derived, or delete the bindings altogether, so that the context is unbound. Once the user is satisfied with the specification of the context, the user can click on a "Finish" button 1332 displayed on the context building wizard page 1330 to complete the building operation. The context building tool can then store the specification of the generated context in a component repository 110.

Figure 13D:
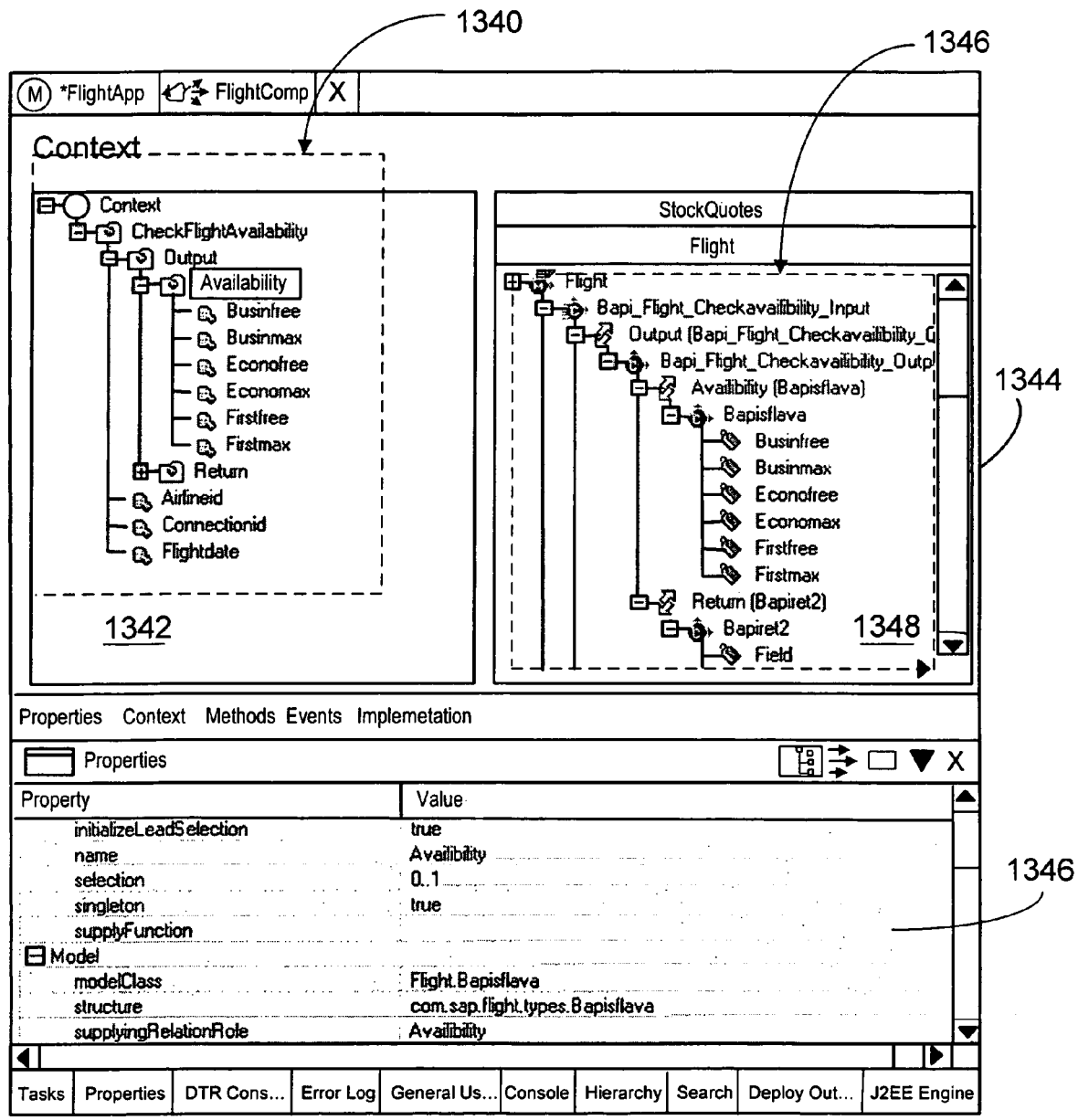

As shown in FIG. 13d, the context building tool can be implemented to display the result of the building operation in a context building tool interface 1344. The generated context 1340 is displayed in a context window 1342 on the left-hand side of the context building tool interface 1344. The model 1346 to which the context 1340 is bound is displayed in a mode window 1348. If desired, the user may drag and drop a context element of the context 1340 on an element of the model 1346 to modify an existing model binding. The model binding of each context node and attribute of the generated context 1340 is shown in a property window 1346. In one implementation, the property window 1346 also displays property information about a selected node or attribute of the context structure 1340, and lets the user edit such information.

Figure 13E:
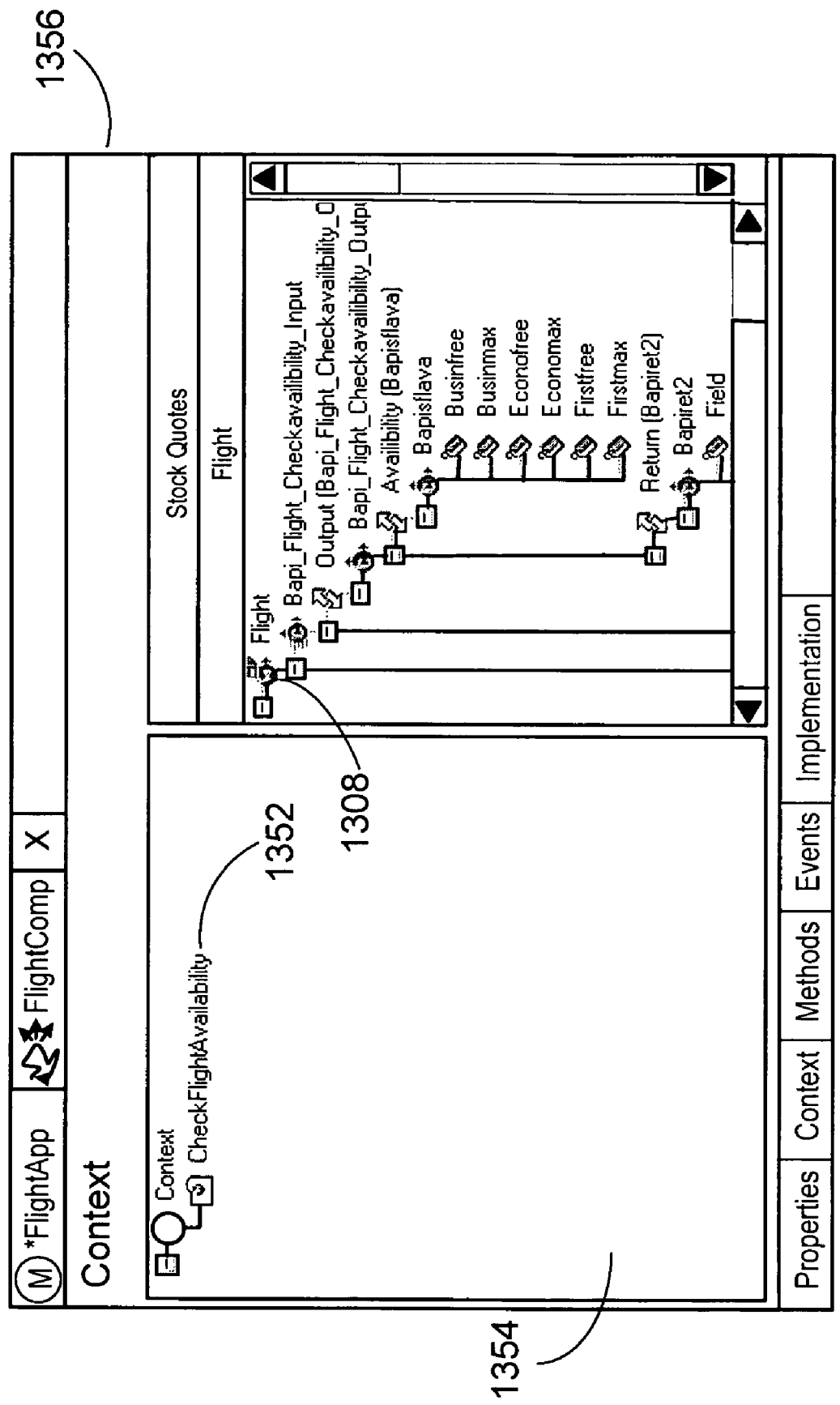
Figure 13F:
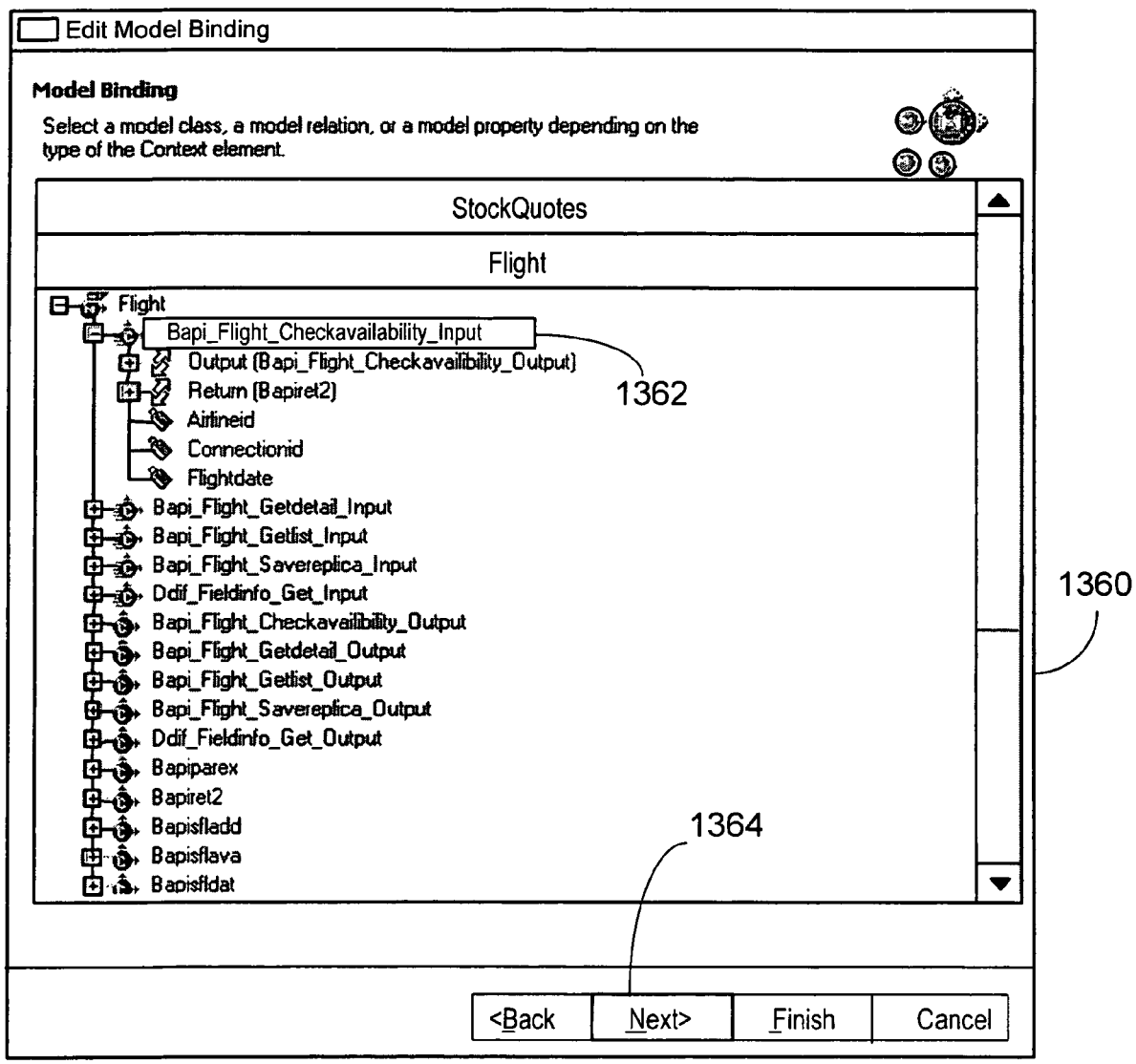

In another example, the user creates an initial source context structure in the source window 1354 as shown in FIG. 13e. The user can then "right-click" on the CheckFlightAvailability node 1352 and select a "build" function from a pull-down menu displayed on the context building tool interface 1356. This action causes the context building tool to launch a context building wizard page 1360 (FIG. 13f) that displays all the model classes associated with the Flight model having a root node 1308 (FIG. 13e). As shown in FIG. 13f, the user can select the element of the model to which the user desires the initial source context element be bound by highlighting a model element (e.g., Bapi_Flight_Checkavailibility_Input model class 1362) and clicking on the "Next" button 1364 displayed on the context building wizard page 1360. The context building tool then provides wizard pages in which the user can specify/modify the model bindings as described above.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, stored on a storage device, the computer program product comprising instructions operable to cause a data processing apparatus to:
    receive a specification of an existing model comprising multiple model classes, each model class having one or more model class properties and one or more relationships to other model classes, wherein the specification defines a structure of the existing model and includes mappings and bindings between contexts and models;
    create a new context based on the existing model;
    create a storage area structure for the new context based on the specification of the existing model, the storage area structure comprising:
        multiple nodes, each node corresponding to a model class;

multiple attributes, each attribute corresponding to a model class property; and relationships between the nodes and attributes based on the relationships between the model classes;

derive data dependency relationships for the new context by binding the nodes and attributes of the storage area structure to corresponding elements of the existing model;

display one or more datalinks showing a data dependency direction for each data dependency relationship to a user, the data dependency direction being visualized by displaying, on a display unit, a datalink represented as a directed arrow connecting the new context to the existing model, wherein the user can filter the one or more datalinks using filter criteria such that directed arrows representing datalinks satisfying the filter criteria are displayed on the display unit, while directed arrows representing datalinks not satisfying the filter criteria are not displayed on the display unit;

create a visual interface having a first view and a second view, wherein the visual interface is configured to show the first view without showing the second view, each of the first and second views comprising at least one inbound plug and at least one outbound plug;

establish a navigational link connecting the outbound plug of the first view to the inbound plug of the second view;

define at least one transition between the views based on the navigational link receive, from the user, a request for a detailed view of a selected datalink from among the one or more displayed datalinks;

display, upon receiving the user request, a detailed view for the selected datalink, the detailed view providing detailed mapping information corresponding to the selected datalink;

modify, by the user, the selected datalink using the displayed detailed view corresponding to the selected datalink; and store the storage area structure of the new context containing the modified datalink in a component repository.

2. The product of claim 1, wherein the operation to create the storage area structure is initiated by user input provided in a graphical user interface.

3. The product of claim 2, wherein the user input comprises a drag-and-drop operation.

4. The product of claim 1, wherein the operations to receive the specification for the existing model and to create the storage area structure are initiated by the user under the guidance of a wizard.

5. The product of claim 1, wherein the storage area structure is hierarchical.

6. The product of claim 5, wherein the storage area structure is a tree.

7. The product of claim 1, wherein the instructions are further operable to cause the data processing apparatus to:
name the nodes and attributes based on the corresponding model classes and model class properties.

8. The product of claim 1, wherein the instructions are further operable to cause the data processing apparatus to:
modify one or more properties of the created storage area structure.

9. The product of claim 1, wherein the instructions are further operable to cause the data processing apparatus to:
rename one or more of the nodes and attributes in the storage area structure.

10. The product of claim 1, wherein the instructions are further operable to cause the data processing apparatus to:

display the created storage area structure in a graphical user interface.

11. A method comprising:

receiving a specification of an existing model comprising multiple model classes, each model class having one or more model class properties and one or more relationships to other model classes, wherein the specification defines a structure of the existing model and includes mappings and bindings between contexts and models;

creating a new context based on the existing model;

creating a storage area structure for the new context based on the specification of the existing model, the storage area structure comprising:

multiple nodes, each node corresponding to a model class;

multiple attributes, each attribute corresponding to a model class property; and relationships between the nodes and attributes based on the relationships between the model classes;

deriving data dependency relationships for the new context by binding the nodes and attributes of the storage area structure to corresponding elements of the existing model;

displaying one or more datalinks showing a data dependency direction for each data dependency relationship to a user, the data dependency direction being visualized by displaying, on a display unit, a datalink represented as a directed arrow connecting the new context to the existing model, wherein the user can filter the one or more datalinks using filter criteria such that directed arrows representing datalinks satisfying the filter criteria are displayed on the display unit, while directed arrows representing datalinks not satisfying the filter criteria are not displayed on the display unit;

creating a visual interface having a first view and a second view, wherein the visual interface is configured to show the first view without showing the second view, each of the first and second views comprising at least one inbound plug and at least one outbound plug;

establishing a navigational link connecting the outbound plug of the first view to the inbound plug of the second view;

defining at least one transition between the views based on the navigational link;

receiving, from the user, a request for a detailed view of a selected datalink from among the one or more displayed datalinks;

displaying, upon receiving the user request, a detailed view for the selected datalink, the detailed view providing detailed mapping information corresponding to the selected datalink;

modifying, by the user, the selected datalink using the displayed detailed view corresponding to the selected datalink; and storing the storage area structure of the new context having the modified datalink in a component repository.

12. The method of claim 11, wherein the operations to receive the specification for the existing model and to create the storage area structure are initiated by the user under the guidance of a wizard.

13. A processor comprising:

means for receiving a specification of an existing model comprising multiple model classes, each model class having one or more model class properties and one or more relationships to other model classes, wherein the specification defines a structure of the existing model and includes mappings and bindings between contexts and models;

means for creating a new context based on the existing model;

means for creating a storage area structure for the new context based on the specification of the existing model, the storage area structure comprising:

multiple nodes, each node corresponding to a model class;

multiple attributes, each attribute corresponding to a model class property; and relationships between the nodes and attributes based on the relationships between the model classes;

means for deriving data dependency relationships for the new context by binding the nodes and attributes of the storage area structure to corresponding elements of the existing model;

means for displaying one or more datalinks showing a data dependency direction for each data dependency relationship to a user, the data dependency direction being visualized by displaying, on a display unit, a datalink represented as a directed arrow connecting the new context to the existing model, wherein the user can filter the one or more datalinks using filter criteria such that directed arrows representing datalinks satisfying the filter criteria are displayed on the display unit, while directed arrows representing datalinks not satisfying the filter criteria are not displayed on the display unit;

means for creating a visual interface having a first view and a second view, wherein the visual interface is configured to show the first view without showing the second view, each of the first and second views comprising at least one inbound plug and at least one outbound plug;

means for establishing a navigational link connecting the outbound plug of the first view to the inbound plug of the second view;

means for defining at least one transition between the views based on the navigational link;

means for receiving, from the user, a request for a detailed view of a selected datalink from among the one or more displayed datalinks;

means for displaying, upon receiving the user request, a detailed view for the selected datalink, the detailed view providing detailed mapping information corresponding to the selected datalink;

means for modifying, by the user, the selected datalink using the displayed detailed view corresponding to the selected datalink; and means for storing the storage area structure of the new context having the modified datalink in a component repository.

14. A computer program product, stored on a storage device, the computer program product comprising instructions operable to cause a data processing apparatus to:

receive a specification defining a structure of an existing target storage area structure comprising one or more target nodes and target attributes, and relationships between the target nodes and target attributes;

create a source storage area structure based on the specification of the existing target storage area structure, the source storage area structure comprising:

one or more source nodes, each source node corresponding to a target node;

one or more source attributes, each source attribute corresponding to a target attribute; and relationships between the source nodes and source attributes based on the relationships between the target nodes and target attributes;

derive data dependency relationships for the source storage area structure by mapping the source nodes and source attributes of the source storage area structure to corresponding target nodes and target attributes of the existing target storage area structure;

display one or more datalinks showing a data dependency direction for each data dependency relationship to a user, the data dependency direction being visualized by displaying, on a display unit, a datalink represented as a directed arrow connecting the new context to the existing model, wherein the user can filter the one or more datalinks using filter criteria such that directed arrows representing datalinks satisfying the filter criteria are displayed on the display unit, while directed arrows representing datalinks not satisfying the filter criteria are not displayed on the display unit;

create a visual interface having a first view and a second view, wherein the visual interface is configured to show the first view without showing the second view, each of the first and second views comprising at least one inbound plug and at least one outbound plug;

establish a navigational link connecting the outbound plug of the first view to the inbound plug of the second view;

define at least one transition between the views based on the navigational link;

receive, from the user, a request for a detailed view of a selected datalink from among the one or more displayed datalinks;

display, upon receiving the user request, a detailed view for the selected datalink, the detailed view providing detailed mapping information corresponding to the selected datalink;

modify, by the user, the selected datalink using the displayed detailed view corresponding to the selected datalink; and store the source storage area structure containing the modified datalink in a component repository.

15. The product of claim 14, wherein the operation to create the source storage area structure is initiated by a user input provided in a graphical user interface.

16. The product of claim 15, wherein the user input gesture is a drag-and-drop operation.

17. The product of claim 14, wherein the operations to receive the specification for the existing target storage area structure and to create the source storage area structure are initiated by the user under the guidance of a wizard.

18. The product of claim 14, wherein the source storage area structure and the target storage area structure are hierarchical.

19. The product of claim 18, wherein the source storage area structure and the target storage area structure are trees.

20. The product of claim 14, wherein the instructions are further operable to cause the data processing apparatus to:

name the source nodes and source attributes based on the corresponding target nodes and target attributes.

21. The product of claim 14, wherein the instructions are further operable to cause the data processing apparatus to:

modify one or more properties of the source storage area structure.

22. The product of claim 14, wherein the instructions are further operable to cause the data processing apparatus to:

rename one or more of the source nodes and source attributes in the source storage area structure.

23. The product of claim 14, wherein the instructions are further operable to cause the data processing apparatus to:
   display the created source storage area structure in a graphical user interface.

24. A method comprising:
   receiving a specification defining a structure of an existing target storage area structure comprising one or more target nodes and target attributes, and relationships between the target nodes and target attributes;
   creating a source storage area structure based on the specification of the existing target storage area structure, the source storage area structure comprising:
      one or more source nodes, each source node corresponding to a target node;
      one or more source attributes, each source attribute corresponding to a target attribute; and
      relationships between the source nodes and source attributes based on the relationships between the target nodes and target attributes;
   deriving data dependency relationships for the source storage area structure by mapping the source nodes and source attributes of the source storage area structure to corresponding target nodes and target attributes of the existing target storage area structure;
   displaying one or more datalinks showing a data dependency direction for each data dependency relationship to a user, the data dependency direction being visualized by displaying, on a display unit, a datalink represented as a directed arrow connecting the new context to the existing model, wherein the user can filter the one or more datalinks using filter criteria such that directed arrows representing datalinks satisfying the filter criteria are displayed on the display unit, while directed arrows representing datalinks not satisfying the filter criteria are not displayed on the display unit;
   creating a visual interface having a first view and a second view, wherein the visual interface is configured to show the first view without showing the second view, each of the first and second views comprising at least one inbound plug and at least one outbound plug;
   establishing a navigational link connecting the outbound plug of the first view to the inbound plug of the second view;
   defining at least one transition between the views based on the navigational link;
   receiving, from the user, a request for a detailed view of a selected datalink from among the one or more displayed datalinks;
   displaying, upon receiving the user request, a detailed view for the selected datalink, the detailed view providing detailed mapping information corresponding to the selected datalink;
   modifying, by the user, the selected datalink using the displayed detailed view corresponding to the selected datalink; and
   storing the source storage area structure containing the modified datalink in a component repository.

25. The method of claim 24, wherein the operations to receive the specification for the target storage area structure and to create the source storage area structure are initiated by the user under the guidance of a wizard.

26. A processor comprising:
   means for receiving a specification defining a structure of an existing target storage area structure comprising one or more target nodes and target attributes, and relationships between the target nodes and target attributes;
   means for creating a source storage area structure based on the specification of the existing target storage area structure, the source storage area structure comprising:
      one or more source nodes, each source node corresponding to a target node;
      one or more source attributes, each source attribute corresponding to a target attribute; and
      relationships between the source nodes and source attributes based on the relationships between the target nodes and target attributes;
   means for deriving data dependency relationships for the source storage area structure by mapping the source nodes and source attributes of the source storage area structure to corresponding target nodes and target attributes of the existing target storage area structure;
   means for displaying one or more datalinks showing a data dependency direction for each data dependency relationship to a user, the data dependency direction being visualized by displaying, on a display unit, a datalink represented as a directed arrow connecting the new context to the existing model, wherein the user can filter the one or more datalinks using filter criteria such that directed arrows representing datalinks satisfying the filter criteria are displayed on the display unit, while directed arrows representing datalinks not satisfying the filter criteria are not displayed on the display unit;
   means for creating a visual interface having a first view and a second view, wherein the visual interface is configured to show the first view without showing the second view, each of the first and second views comprising at least one inbound plug and at least one outbound plug;
   means for establishing a navigational link connecting the outbound plug of the first view to the inbound plug of the second view;
   means for defining at least one transition between the views based on the navigational link;
   means for receiving, from the user, a request for a detailed view of a selected datalink from among the one or more displayed datalinks;
   means for displaying, upon receiving the user request, a detailed view for the selected datalink, the detailed view providing detailed mapping information corresponding to the selected datalink;
   means for modifying, by the user, the selected datalink using the displayed detailed view corresponding to the selected datalink; and
   means for storing the source storage area structure containing the modified datalink in a component repository.

* * * * *